United States Patent
Sandhu et al.

(10) Patent No.: US 6,347,307 B1
(45) Date of Patent: Feb. 12, 2002

(54) SYSTEM AND METHOD FOR CONDUCTING WEB-BASED FINANCIAL TRANSACTIONS IN CAPITAL MARKETS

(75) Inventors: Harpal S. Sandhu, Palo Alto; Viral V. Tolat, Menlo Park, both of CA (US); Stephen Rees, Sneyd Park (GB)

(73) Assignee: Integral Development Corp., Mt. View, CA (US)

(*) Notice: Subject to any disclaimer, the term of this patent is extended or adjusted under 35 U.S.C. 154(b) by 0 days.

(21) Appl. No.: 09/593,324

(22) Filed: Jun. 13, 2000

Related U.S. Application Data

(60) Provisional application No. 60/139,113, filed on Jun. 14, 1999, and provisional application No. 60/162,873, filed on Nov. 1, 1999.

(51) Int. Cl.$^7$ .............................................. G06F 17/60
(52) U.S. Cl. .............................. 705/35; 705/36; 705/37
(58) Field of Search .............................. 705/35, 36, 37

(56) References Cited

U.S. PATENT DOCUMENTS

| | | | | |
|---|---|---|---|---|
| 5,497,317 A | * | 3/1996 | Hawkins et al. | ............ 364/408 |
| 5,630,127 A | * | 5/1997 | Moore et al. | ................ 395/615 |
| 5,787,402 A | * | 7/1998 | Potter et al. | .................. 705/37 |

(List continued on next page.)

FOREIGN PATENT DOCUMENTS

| JP | 10222581 | * | 8/1998 | ........... G06F/17/60 |
|---|---|---|---|---|

OTHER PUBLICATIONS

FinXML.org web page located at http://www.finxml.com/default.asp. Last visited on Jun. 27, 2001. p. 1.*
Goldfarb, Charles et al. XML Handbook. Prentice–Hall, Inc. 1998. pp. 89; 316–317; 527–529.*

(List continued on next page.)

Primary Examiner—Tariq R. Hafiz
(74) Attorney, Agent, or Firm—Chien-Wei (Chris) Chou; Oppenheimer Wolff & Donnelly LLP

(57) ABSTRACT

The present invention provides a system and method that enables users, such as institutional investors and financial institutions, to engage in capital market transactions, including the trading of Over-the-Counter financial products, via the Internet (including the World Wide Web). The system includes a variety of servers, applications, and interfaces that enable users to interactively communicate and trade financial instruments among one another, and to manage their portfolios. Interactive communications supported by the system include: requesting price quotes, monitoring and reviewing quote requests, issuing price quotes, monitoring and reviewing price quotes, negotiation between users, acceptance of price quotes, reporting, portfolio management, analysis of financial information and market data, calendaring, and communications among users and/or system administrators, including e-mail, chat, and message boards.

The present invention also supports communications with the server side in an automated manner via an automated processor. Such automated communications enable connectivity with users' internal, back-end systems to execute automated, straight-through processing, including transaction pricing, payment scheduling and journaling, derivatives trading, trade confirmation, and trade settlement. Such communications are facilitated using a novel XML-based syntax (FinXML™) and XSL-based processing language (FinScript™). FinXML provides a standard data interchange language for capital market transactions and supports a broad set of elements and attributes that represent a wide variety of financial transactions, reference data, and market data. The common description of the FinXML syntax can be used for all aspects of straight-through-processing, including deal creation, confirmation, settlement, payment, risk management, and accounting.

33 Claims, 18 Drawing Sheets

U.S. PATENT DOCUMENTS

| | | | | |
|---|---|---|---|---|
| 5,913,202 A | * | 6/1999 | Motoyama | 705/35 |
| 5,973,695 A | * | 10/1999 | Walsh et al. | 345/357 |
| 6,012,098 A | * | 1/2000 | Bayeh et al. | 709/246 |
| 6,049,783 A | * | 4/2000 | Segal et al. | 705/37 |
| 6,125,391 A | * | 9/2000 | Meltzer et al. | 709/223 |
| 6,144,990 A | * | 11/2000 | Brandt et al. | 709/203 |
| 6,167,448 A | * | 12/2000 | Hemphill et al. | 709/224 |
| 6,182,029 B1 | * | 1/2001 | Friedman | 704/9 |
| 6,205,433 B1 | * | 3/2001 | Boesch et al. | 705/26 |

OTHER PUBLICATIONS

Koch, Timothy W., ed. Banking and Finance Terminology. Fourth Edition. Washington, D.C.: American Bankers Association, 1999.*

Java Servlet Technology (Product Description). Sun Microsystems Web Page. http://java.sun.com/products/servlet. Printed Oct. 2, 2000.*

JavaScript (Functional Description). Netscape Web Page. http://home.netscape.com/eng/mozilla/3.0/handbook/javascript/getstart.htm. Printed Oct. 2, 2000.*

"Currency Management Corporation: CMC Hits $20 Billion Traded Over Internet in Year," M2 Presswire. Feb. 16, 1998. pp. 1–2.*

Higgins, Kieran. "Internet FX Trading Goes On–Line," Corporate Finance. Sep. 16, 1996. pp. 1–2.*

Fields, Duane K. "Java Servlets for JavaScripters," Netscape Communications Corporation. Oct. 1998. pp. 1–10.*

"Risk Portals Make Their Debut", *Wall Street & Technology Online* (Jun. 2, 2000), <www.wstonline.com/story/WST20000602S0015>.

Adriana Senior, "Web Sites Planned for Trade in Credit Derivatives, Forex", *American Banker Online* (Nov. 9, 1999), <www.integral.com/news_and _events/itn_991109.asp>.

Gus Hahn, "Derivatives Standards", *Wall Street & Technology Online* (Oct. 1, 1999), <www.westonline.com/story/WST20000609S0001>.

Bernhard Warner, "Big Brokerage Firms Inch Online", *The Standard* (May 7, 1999), <www.thestandard.com/article/display/0,1151,4519,00.html>.

Perry Colley McKinney, "Internet Foreign Exchange Trading Draws Smaller Investors", *The Detroit News* (Sep. 26, 1998), <http://detnews.com/1998/technology/9809/26/09260095.html>.

John Greenwald, "A Nation of Stock Keepers", *Time*, vol. 151, No. 18 (May 11, 1998), <www.time.com/time/magazine/1998/dom/980511/business_.a_nation_of_st6.htm>.

Open Financial Exchange, "Intuit, Microsoft, and CheckFree Create Open Financial Exchange", (Jan. 16, 1997) <www.ofx.net/ofx/pressget.asp?id=5>.

* cited by examiner

FinXML Trade Element Structure

FinXML External Party Definition

FinXML Internal Party Definition

FinXML Events Element Structure

XML Connect Message Structure

SYSTEM AND METHOD FOR CONDUCTING WEB-BASED FINANCIAL TRANSACTIONS IN CAPITAL MARKETS

CROSS-REFERENCE TO RELATED APPLICATIONS

This is a continuation-in-part application of: (i) U.S. Provisional Patent Application Ser. No. 60/139,113 filed Jun. 14, 1999, entitled "SYSTEM AND METHOD FOR AN XML VOCABULARY FOR CAPITAL MARKETS"; and (ii) U.S. Provisional Patent Application Ser. No. 60/162,873 filed Nov. 1, 1999, entitled "METHOD AND APPARATUS FOR WEB-BASED MANAGEMENT OF FINANCIAL RISK AND PRICING AND TRADING OF FINANCIAL PRODUCTS". This application incorporates by reference U.S. Provisional Patent Application Nos. 60/139,113 and 60/162,873.

FIELD OF THE INVENTION

This invention relates generally to the field of interactive and automated Web-based financial transaction applications, and in particular to interactive and automated systems and methods for conducting financial transactions and managing portfolios and related financial information in capital markets.

BACKGROUND

During the evolution of the Internet, including the World Wide Web, there has been a continual introduction of applications and services to enable individuals and organizations to conduct financial research, manage their financial portfolios, and engage in certain types of financial transactions. The wide array of applications and services ranges from on-line banking to stock quote and financial information services to sites that enable users to engage in on-line, real-time market trades involving various instruments such as stocks, stock options, bonds, and mutual funds. The trading services, for example E*TRADE Securities, Inc.'s "E*TRADE"<www.etrade.com>, Charles Schwab & Co., Inc.'s "Schwab.com" <www.schwab.com>, and Fidelity Brokerage Services, Inc.'s "Fidelity.com" <www.fidelity.com>, permit trading of standard instruments in recognized markets. In such services, the investor uses credit or an account set up through the trade service to engage in trades through the service's proprietary system and interfaces. Such services, which are geared towards individual investors, do not permit seamless integration with users' internal or back-end systems or the creation and trading of customized transactions. These services, and many others like them, do not enable trading between parties in currency derivatives or foreign exchange, or the pricing and modeling of other capital market transactions.

Some steps have been taken to tap into the potentially vast market of institutional investors wishing to engage in complex transactions via the Internet. The "Open Financial Exchange" (Intuit Inc., Microsoft Corp., CheckFree Corp.) <www.ofx.net> was created to provide a common specification for the electronic exchange of financial data between financial institutions, businesses, and consumers via the Internet that enables financial data exchange among disparate systems, in order to support online banking, bill payment and presentment, and the trading of stocks, bonds, and mutual funds. The Open Financial Exchange does not, however, provide a vocabulary, platform, and communication protocol to enable the creation, negotiation, and execution of complex, capital market transactions among financial institutions and institutional investors.

What is needed is a system and method that enables institutional investors and financial institutions to seamlessly create, price, negotiate, execute, settle and analyze complex, capital market transactions, including interest and currency derivatives, foreign exchange, loans and deposits, and fixed-income instruments, using a standard vocabulary and messaging system that enables seamless integration with the proprietary, existing systems of the users.

SUMMARY

The present invention provides a system and method that enables users, such as "Members" (e.g., institutional investors) and "Providers" (e.g., financial institutions), to engage in capital market transactions, including the trading of Over-the-Counter financial products, via the Internet (including the World Wide Web). The system includes a variety of servers, applications, and interfaces that enable users to interactively communicate and trade financial instruments among one another, and to manage their portfolios. Interactive communications supported by the system include: requesting price quotes, monitoring and reviewing quote requests, issuing price quotes, monitoring and reviewing price quotes, negotiation between Members and Providers, acceptance of price quotes, reporting, portfolio management, analysis of financial information and market data, calendaring, and communications among Members, Providers, and/or system administrators, including e-mail, chat, and message boards.

The present invention also supports communications with the server side in an automated manner via an automated processor (the "Connect Processor" and "Connect Messaging Server"). Such automated communications enable connectivity with users' internal, back-end systems to execute automated, straight-through processing, including transaction pricing, payment scheduling and journaling, derivatives trading, trade confirmation, and trade settlement. Such communications are facilitated using a novel XML-based syntax ("FinXML") and XSL-based processing language ("FinScript"). FinXML provides a standard data interchange language for capital market transactions and supports a broad set of elements and attributes that represent a wide variety of financial transactions, reference data, and market data. The common description of the FinXML syntax can be used for all aspects of straight-through-processing, including deal creation, confirmation, settlement, payment, risk management, and accounting.

BRIEF DESCRIPTION OF THE FIGURES

The above objects and description of the present invention may be better understood with the aid of the following text and accompanying drawings.

DETAILED DESCRIPTION OF THE INVENTION

A. System Functionality

The technology of the present invention can be embodied in various forms to provide a platform for conducting interactive and automated financial transactions and management of portfolios and related financial information in capital markets. The platform enables members, including end-users and providers of financial products and services, to engage in the trading of standard and customized financial instruments in capital markets. System functionality includes: capture and pricing of financial instrument trades; presentation of real-time market data; saving of completed trades to a portfolio; management of trading workflow; transmission of trades to end-users' proprietary, back-end systems for pricing, trading, payment processing, confirmation, and settlement; performance of portfolio analysis; performance of risk management analysis; and inter-user communications.

In the present embodiment of the invention, the system includes both server-side and client-side functionality. The server-side functionality enables system users to interactively and seamlessly: engage in financial instrument trades; perform portfolio management, analysis, and reporting; obtain real-time market data and news; communicate with the system and other users via electronic mail, chat, and message boards; and maintain a calendar. The server-side includes interactive system servers that host such user activities, as well as one or more system databases, and an automated messaging server that controls communication with the automated back-end systems of clients.

The client side functionality includes an automated processor that communicates with the automated messaging server of the system side and serves as a seamless interface to the automated back-end systems and proprietary databases of clients. Thus, the system enables organizations with disparate systems and data to engage in transactions using the common functionality and interfaces of this invention. The client side also includes client web browsers that enable interactive communication with the system servers.

The invention described herein provides a standard, XML-based vocabulary to represent and facilitate the financial transactions, as well as a system and method for converting users' data and information to/from the standard vocabulary and communicating such information through the system in an automated manner.

1. System Architecture Overview

Figure 1:
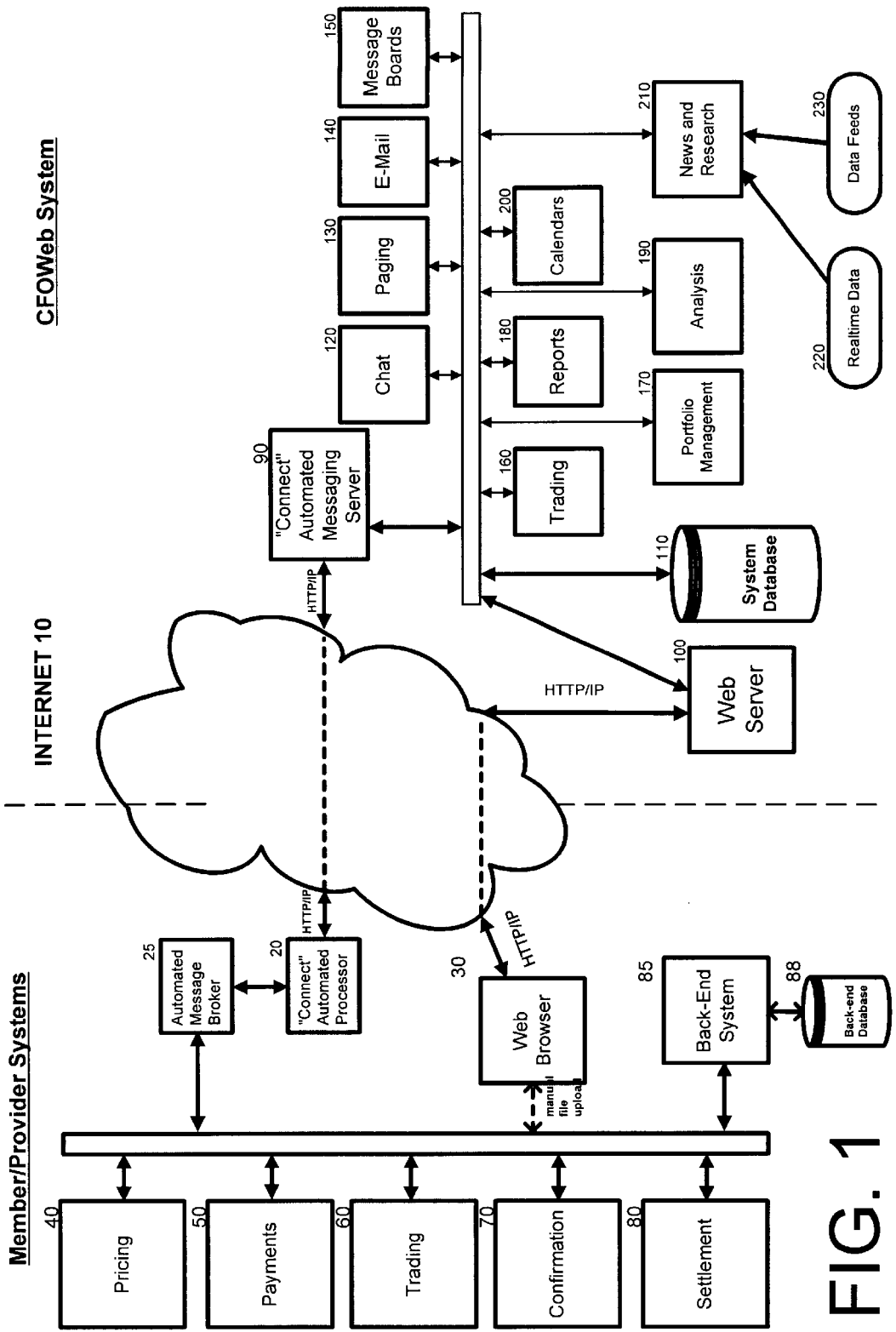
FIG. 1 shows the architecture of an embodiment of the present invention.

FIG. 1 illustrates the architecture of one embodiment of this invention. This embodiment is presented for purposes of illustration and description, and other embodiments will be apparent to and could be implemented by practitioners skilled in this art.

a. Server Side

The server side (sometimes referred to as the "CFOWeb System" in this embodiment) communicates with the client side (consisting of users known as "Members", e.g., corporations and institutional investors, and "Providers", e.g., financial institutions) via the Internet (including the World Wide Web) 10. The server side includes a variety of interactive system servers that provide functionality to users. Web Server 100 enables communications (through the Internet via a transfer protocol such as, e.g., HyperText Transfer Protocol or "HTTP/IP") between users who connect to the server side through their web browsers 30 and the various system servers. Trading server 160 provides a graphic user interface and applications that enable users to interactively trade financial derivatives among each other. Portfolio management server 170 provides a graphic user interface and applications that enable users to manage their portfolios of financial derivatives. Reports server 180 provides a graphic user interface and applications that enable users to run and produce standard and customizable reports regarding their portfolios, including mark to market, upcoming events, and trade lists. Analysis server 190 provides a graphic user interface and applications that enable users to run analytics against their portfolios, including valuation, and interest rate sensitivity. Calendar server 200 provides a graphic user interface and applications that enable users to automatically calendar key dates regarding settlement, payments, cash flows, and other details related to their financial derivative transactions and portfolios. News and research server 210 provides a graphic user interface and applications that enable users to obtain real-time market data and financial and other news, as well as proprietary third-party data feeds. News and research server 210 includes connections to real-time market data feeds and news services 220 and third-party data feeds 230.

The interactive system servers also include servers that enable communication among system users and administrators. Chat server 120 provides real-time chat, thus enabling users to engage in discussion forums related to financial derivatives. Paging server 130 enables users to build a messaging community and determine which users are online and available to receive messages at a given instance. E-mail server 140 provides an intra-system electronic mail vehicle, enabling communications among users and system administrators, including all aspects of a financial trade from quote requests to settlement. Message boards server 150 provides an arena for users and system administrators to post and read system-wide messages, as well as quote requests and quotes.

Automated messaging server 90 (sometimes referred to as the "Connect Messaging Server" in this embodiment) controls communications (through the Internet via a transfer protocol, e.g., HTTP/IP) between the various system servers of the server side and users whose internal, back-end systems 85 execute automated processes that require communication with the server side. Such automated processes could include transaction pricing 40, payment scheduling and journaling 50, derivatives trading 60, trade confirmation 70, and trade settlement 80. Communications between Connect Messaging Server 90 and the client side pass through automated processor 20 (sometimes referred to as the "Connect Processor" in this embodiment)—which shares the same functionality as automated messaging server 90—and automated message broker 25 and are facilitated using the "FinXML" vocabulary and the "FinScript" processing language, as described below.

The CFOWeb System includes one or more system databases 110, which store data related to the processing of financial transactions, as well as user communications and interactions with the system servers.

b. Client Side

The client side includes functionality that enables users—Members and Providers—to communicate, either interactively or in an automated manner, with the various system servers. Web browser 30 enables interactive communications (through the Internet via a transfer protocol, e.g., HTTP/IP) between users and the CFOWeb System with connection made on the server side at web server 100. Interactive communications might include: requesting price quotes (Members), monitoring and reviewing quote requests (Providers), issuing price quotes (Providers), monitoring and reviewing price quotes (Members), negotiation between Members and Providers, acceptance of price quotes (Members), reporting, portfolio management, analysis of financial information and market data, calendaring, and communications among Members, Providers, and/or system administrators, including e-mail, chat, and message boards.

Alternatively, users can communicate with the server side in an automated manner via Connect Processor 20 (and automated message broker 25) which communicates (through the Internet via a transfer protocol, e.g., HTTP/IP) with Connect Messaging Server 90. Such automated communications enable users' internal back-end systems 85 (which include one or more back-end databases 88) to execute automated processes, which could include transaction pricing 40, payment scheduling and journaling 50, derivatives trading 60, trade confirmation 70, and trade settlement 80. Such communications are facilitated using the "FinXML" vocabulary and the "FinScript" processing language, as described below.

2. Financial Transaction Functionality

For system users—Members and Providers—the functionality included in an embodiment of this invention can be categorized as follows: pre-transaction, transaction, post-transaction, and general. The present invention (i) automates or (ii) provides an interactive interface for such functionality.

a. Pre-Transaction

Figure 2:
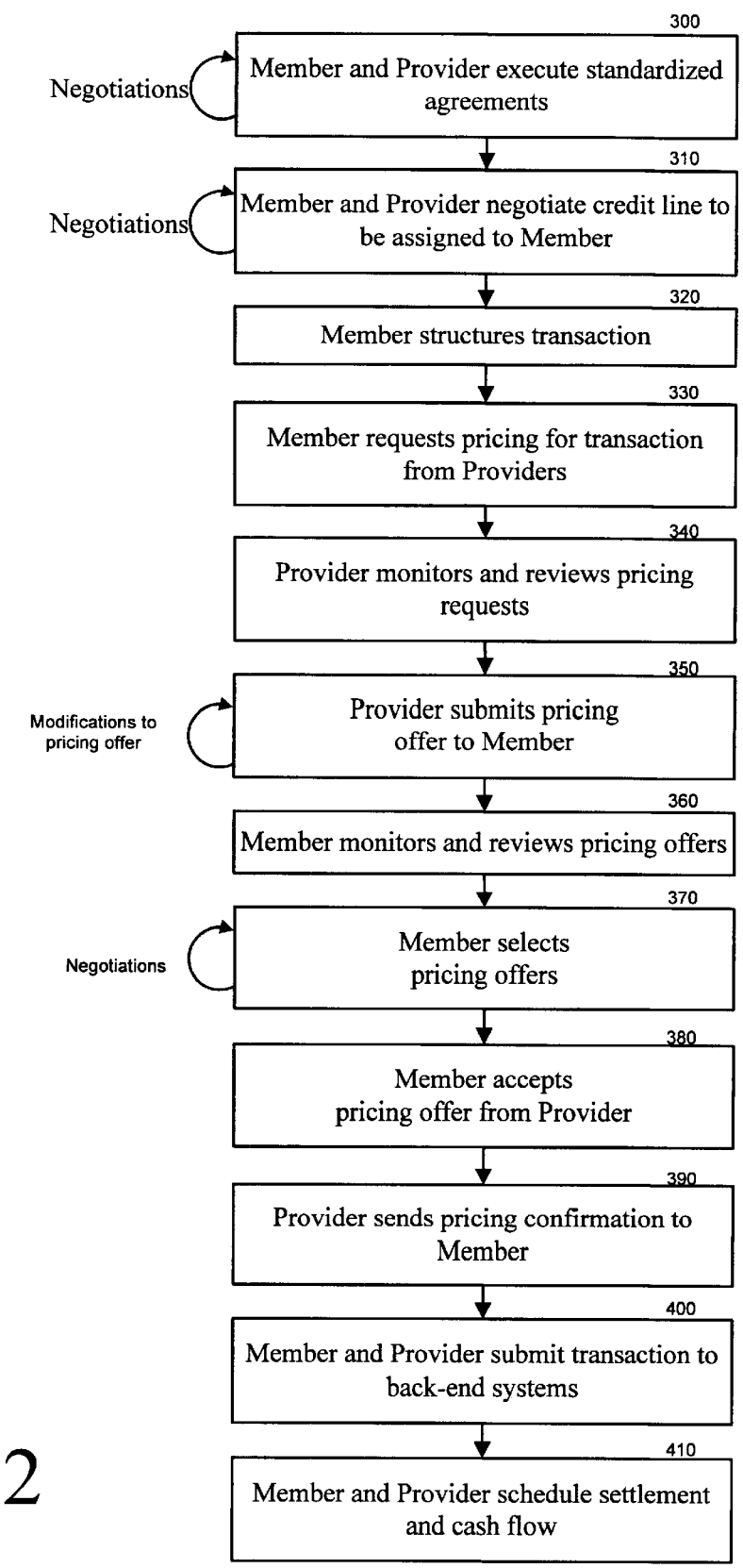
FIG. 2 shows a flowchart of the process by which Members and Providers conduct a financial transaction in an embodiment of the present invention.

Members and Providers (or in other embodiments of this invention, Members and Members) that engage in a financial transaction of a type enabled by this invention proceed through a series of steps illustrated in FIG. 2. When a Member and Provider decide that they may engage in financial transactions in the future, the parties establish their relationship by executing certain agreements (step 300). Such agreements govern the rules of engagement, rate sources, confirmation and settlement procedures, and other information that can be reused over a series of transaction between the parties. The International Swaps and Derivatives Association, Inc. ("ISDA") <http://www.isda.org> provides certain standardized agreements (e.g., "1992 ISDA Master Agreement") that may be used by the parties for these purposes. The parties can carry out this step using the interactive e-mail function of the system (provided by e-mail server 140 in FIG. 1) to exchange information to be included in the agreements. In addition, by combining off-the-shelf electronic signature software with the system, the parties can electronically sign and exchange the standardized agreements. Members and Providers may engage in multiple iterations of this step, depending upon the number of standardized agreements that the parties will execute.

Next, the Member and Provider will negotiate one or more lines of credit to be assigned by the Provider to the Member for future transactions (step 310). Each Member will negotiate such line(s) of credit with each Provider with which the Member intends to engage in future transactions. In assigning a credit line to a Member, the Provider will analyze the Member's asset portfolio, credit ratings, and type of financial transactions to be executed by Member. The parties can carry out this step using the interactive e-mail function of the system (provided by e-mail server 140 in FIG. 1) to exchange information during the credit line negotiations.

b. Transaction

Once the Member and Provider have established their relationship and negotiated a credit line, the Member can commence the process of engaging in a financial transaction. The Member must decide on the type of transaction it wishes to execute (e.g., Foreign Exchange Spot, Foreign Exchange Forward, Interest Rate Swap, etc.) and structure the desired transaction (step 320). In this step, the Member will use the interactive trading function of the system (provided by trading server 160 in FIG. 1), including graphic user interfaces and tools. Depending upon the type of transaction, the structure might include pricing variables, an expiration period, a list of Providers to whom the Member would like to request pricing, and any other particulars specific to the Member and the desired transaction. For example, a Member might specify a Foreign Exchange Spot transaction in which the Member desires to buy 1 million Euro currency for U.S. Dollars, with the transaction request set to expire on Jul. 30, 2000 at 11:59 P.M. Pacific Standard Time.

After structuring the transaction, the Member submits a request for pricing of the transaction to one or more Providers (step 330), using the interactive trading function of the system (provided by trading server 160 in FIG. 1). Alternatively, the Member might communicate a request for pricing directly to a particular Provider using the interactive e-mail function of the system (provided by e-mail server 140 in FIG. 1). Such an e-mail communication would include a URL to the structured transaction and request for pricing.

Providers monitor and review the Member's pricing request (step 340) via communications between the automated messaging server 90 and automated processor 20, as will be described below. Such communications result in the posting of pricing requests on a request-monitoring interface hosted by the system. Upon reviewing the transaction and pricing request, including information about the particular Member (unless the Member's identity was not disclosed), a Provider can submit a pricing offer (i.e., price quote) to the requesting Member (step 350). The submission of the pricing offer occurs via a communication between the automated processor 20 and automated messaging server 90, as will be described below. Each pricing offer typically has an expiration period because of constantly changing market conditions, and the Provider may submit modified pricing offers to the Member.

The Member can monitor and review any pricing offers submitted by Providers (step 360) on a monitoring interface hosted by the system. The Member will select one or more pricing offers (step 370) and negotiate with the particular Provider(s) who provided the offer(s). In the present embodiment, such negotiations may occur using the interactive e-mail function of the system (provided by e-mail server 140 in FIG. 1) or through traditional methods (e.g., telephone calls). The number of iterations of negotiations will depend upon the market volatility and other conditions. In other embodiments of this invention, such negotiations may be unnecessary if certain parameters are met by a Provider's pricing offer.

Following negotiations regarding pricing offers, the Member will accept the best pricing offer (step 380) and communicate its acceptance to the Provider using the interactive trading function of the system (provided by trading server 160 in FIG. 1). The Provider will receive the Member's acceptance via communications between the automated messaging server 90 and automated processor 20, as will be described below. Such communications result in the posting of the Member's acceptance of the pricing offer on the request monitoring interface hosted by the system.

c. Post-Transaction

Upon receipt of the Member's acceptance, the Provider sends confirmation of the transaction to the Member (step 390), including specific terms, payment dates, and amounts. The Provider sends the confirmation information to the Member via communications between the automated processor 20 and the automated messaging server 90, as will be described below. The Provider's back-end system 85 provides automated processing of this information.

Following confirmation, the Member and Provider will submit the transaction to their respective back-end systems 85 (step 400) for purposes including internal accounting and payment scheduling. This step can be handled by the system via an automated connection between the automated processor 20 and the back-end system 85. Using their respective back-end systems 85, the Member and Provider schedule settlement of the transaction and future cash flows (step 410).

d. General

Interactive system functionality that can be accessed and implemented at any time by the Member and Provider includes: reporting; portfolio management; risk management; analysis of financial information and market data; e-mail communication with Members, Providers, and system administrators; chat with Members and Providers; message boards; calendaring; and paging.

B. Automated Processing and Transferring of Financial Information

The present embodiment of this invention supports financial transactions between Members and Providers by providing automated processing and transfer of the underlying financial information between the messaging server of the server side and the automated processor of the client side. The system enables such processing and transfer by using a novel tag-based language—FinXML™—that describes financial instrument trades, including transaction-specific data, reference data, and market data. FinXML conforms to the Extensible Markup Language (XML) 1.0 Recommendation (Feb. 10, 1998), World Wide Web Consortium (Massachusetts Institute of Technology, Institut National de Recherche en Informatique et en Automatique, Keio University) <http://www.w3.org/TR/REC-xml>. The XML Recommendation describes a set of rules for conforming documents that is based around the use of element tags which mark the components of a document or describe the structure of data files as textual documents.

FinXML also conforms to the 1991 ISDA Definitions (and 1998 Supplement) of the International Swaps and Derivatives Association, Inc. ("ISDA") <http://www.isda.org>. The ISDA Definitions provide a set of standard terms for use in privately-negotiated financial derivatives transactions. The element tags and attribute names and values defined in FinXML, as described below, correspond to the terms defined in the ISDA Definitions.

FinXML, as a type of XML vocabulary, is ideally suited to electronic transmission over corporate intranets, extranets, and the Internet (including the World Wide Web), using a transfer protocol such as HTTP/IP. HTTP/IP is intended to transmit text documents such as the HyperText Markup Language ("HTML") documents used to describe the pages to be displayed in a Web browser. XML documents—and, thus, FinXML documents—are similar to HTML documents in that both types of documents are text-based, both consist of a mixture of element tags and data content, and both may include references to other external material.

In a basic financial transaction between two organizations, a financial transaction encoded in XML is sent using a transfer protocol such as HTTP/IP from a client application of one organization to a server of the other organization. The server, in turn, sends back a response that is also encoded in XML.

As will be describe below, the present embodiment of this invention includes a novel method of encoding/decoding financial objects to/from FinXML (or other XML) documents using the automated processor 20 (also known as "Connect Processor") and automated messaging server 90 (also known as "Connect Messaging Server"). In a financial transaction between two organizations, one organization (e.g., a Member) submits a Java object to automated processor 20 which, as will be described below, uses a XML mapping and FinScript™—proprietary stylesheets created in Extensible Stylesheet Language ("XSL")—to create a FinXML (or other XML) document that can be sent using a transfer protocol such as HTTP/IP to the automated messaging server 90 for conversion to an object and processing on the server side. Following processing, the automated messaging server 90 converts objects to a FinXML (or other XML) document and sends the document to the automated processor 20 which, as will be described below, uses FinScript to create a JavaScript program from the FinXML (or other XML) document. In turn, Java objects are created from the JavaScript program and sent to the other organization (e.g., a Provider). XSL, which serves as the foundation for FinScript, is described in the Extensible Stylesheet Language (XSL) Version 1.0 (Mar. 27, 2000), World Wide Web Consortium (Massachusetts Institute of Technology, Institut National de Recherche en Informatique et en Automatique, Keio University) <http://www.w3.org/TR/xsl>.

1. FinXML

In the present embodiment of this invention, FinXML documents are distributed between servers in order to communicate the details of financial transactions and related data. The FinXML syntax provides a general structure for all financial transactions. The financial transactions, in turn, consist of underlying elements, each of which contains attributes and/or other elements.

a. Trade Structure

The basic financial transaction element of the FinXML syntax is a "Trade", of which there are multiple types (described below). The Trade element is the root element for the description of each financial transaction object. The Trade element is contained within the Connect message "payload" component (described below).

Figure 3:
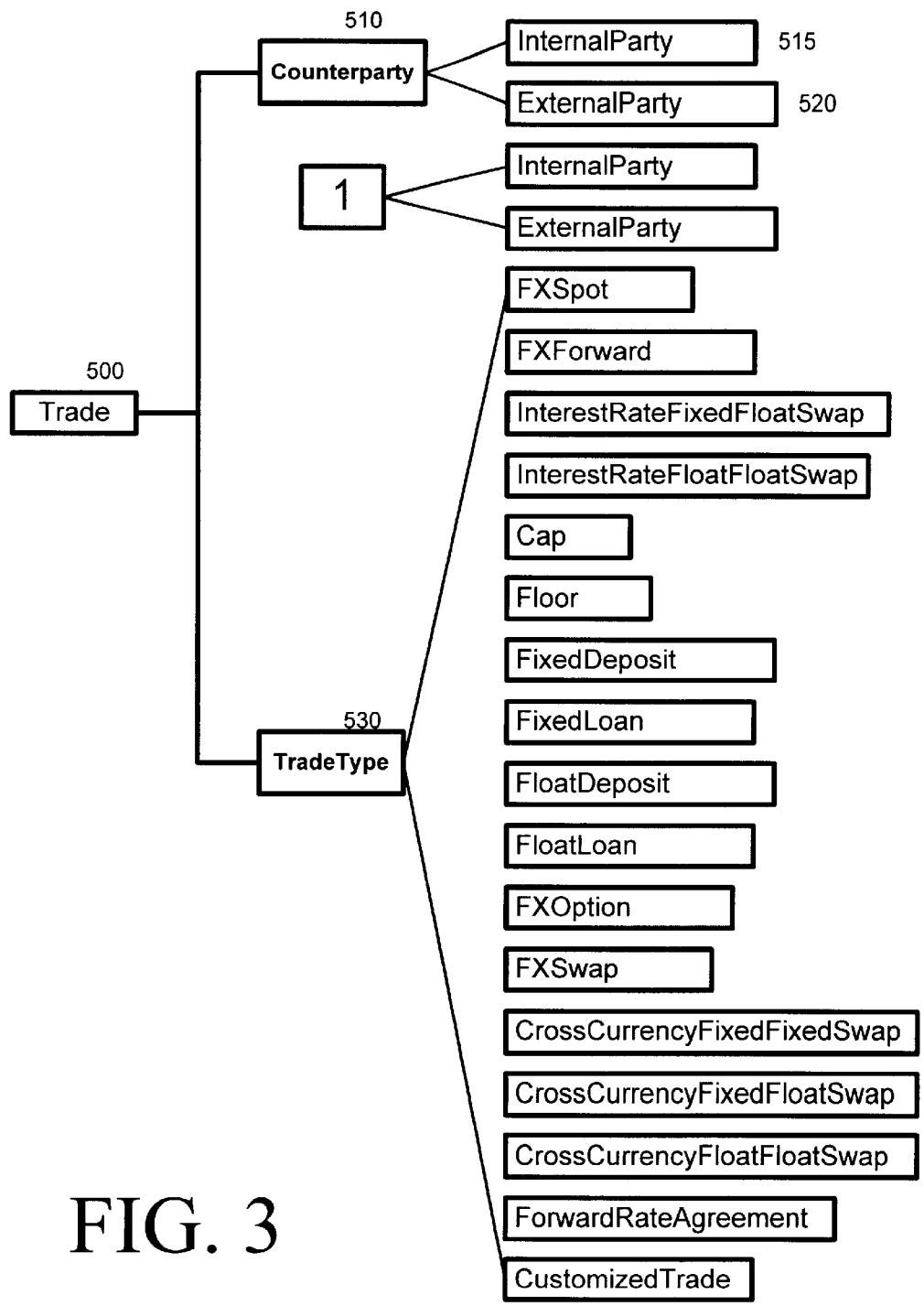
FIG. 3 shows the structure of a FinXML "Trade" element in an embodiment of the present invention.

FIG. 3 illustrates the structure of a Trade element. Trade element 500 contains at least one pair of "Counterparty" elements 510, which are the parties engaged in the transaction. Each Counterparty element 510 can be an "Internal Party" element 515 or an "External Party" element 520 (described below). Trade element 500 also contains a "Trade Type" element 530, which contains one of the following Trade Type sub-elements:

(1) Foreign Exchange ("FX") Spot
(2) FX Forward
(3) Interest Rate Fixed Float Swap
(4) Interest Rate Float Float Swap
(5) Cap
(6) Floor
(7) Fixed Deposit
(8) Fixed Loan
(9) Float Deposit
(10) Float Loan
(11) FX Option
(12) FX Swap
(13) Cross Currency Fixed Fixed Swap
(14) Cross Currency Fixed Float Swap
(15) Cross Currency Float Float Swap
(16) Forward Rate Agreement
(17) Customized Trade Each Trade Type element represents a different type of financial transaction, which will be described separately below.

In the present embodiment of this invention, Trade element 500 has the following XML definition:

```
<!ELEMENT trade (%parties; , (fxSpot | fxForward |
interestRateFixedFloatSwap |
interestRateFloatFloatSwap | cap | floor | fixedDeposit |
fixedLoan | floatDeposit | floatLoan | fxOption | fxSwap
| crossCurrencyFixedFixedSwap | crossCurrencyFixedFloatSwap |
crossCurrencyFloatFloatSwap |
forwardRateAgreement | customizedTrade ) )>
<!ATTLIST trade tradeId CDATA #REQUIRED isBuiltFromParameters
CDATA #IMPLIED>
``` b. Financial Transaction Data

The FinXML syntax describes various types of data that comprise a financial transaction, including transaction data, reference data, and market data. Each of these types of data includes elements and attributes.

i. Transaction Data

Transaction data describes the various components of a financial transaction or trade. These components include "Counterparty" elements, "Trade Type" elements, "Trade Specific" elements, "Financial Event" elements, and "Calculation" elements.

(a) Counterparty Elements

In a financial transaction of the type described by FinXML, there are typically two parties, also referred to as "counterparties". As described above, FinXML describes such parties to a transaction with Counterparty element 510 (as shown in FIG. 3), including an Internal Party element and an External Party element. In the present embodiment of this invention, Counterparty element 510 has the following XML definition:

```
<!ENTITY % counterParty "internalParty | externalParty">
<!ENTITY % parties "(%counterParty;), (%counterParty;)">
```

In each transaction, from the perspective of an organization, that organization is the "internal" party and the other, unrelated organization is the "external" party, e.g., a corporation and a third-party bank that engages in a foreign exchange transaction. Alternatively, where a corporation engages in a transaction with a subsidiary legal entity within the corporation, the subsidiary is also an "internal" party.

Figure 4:
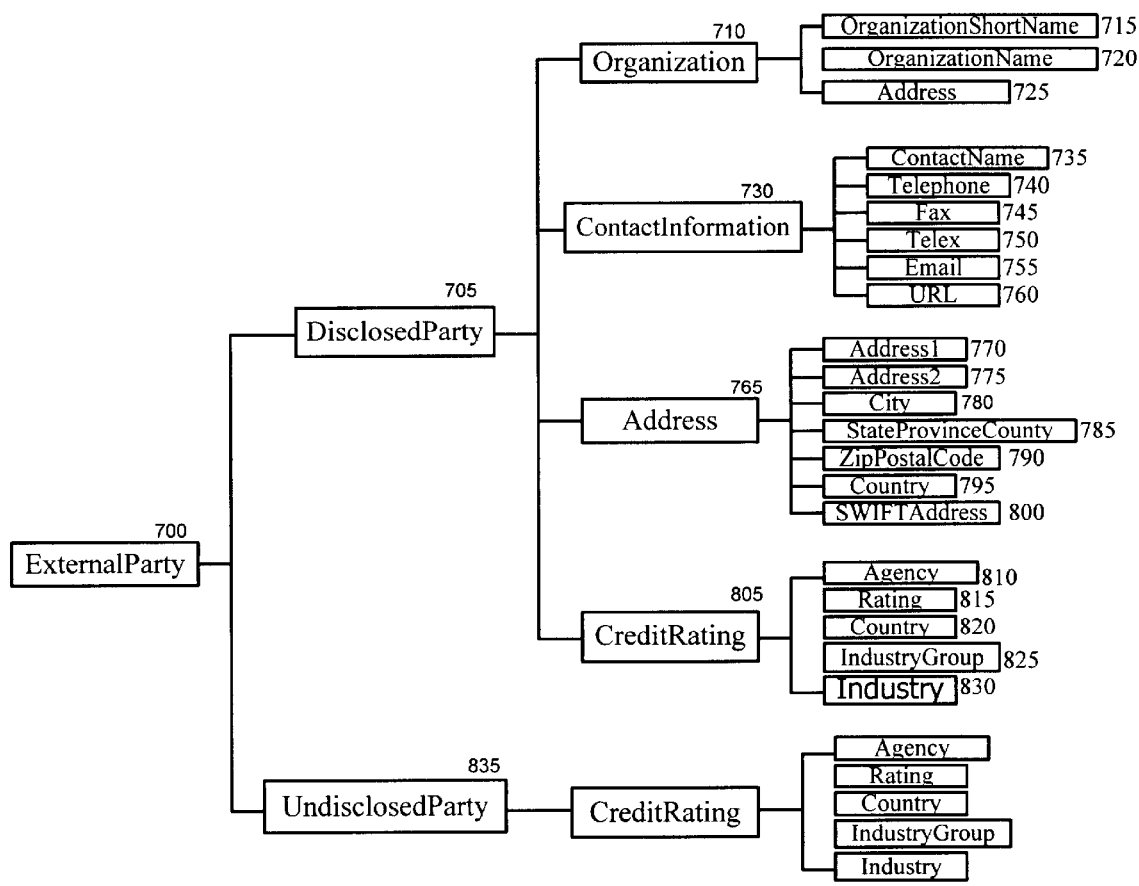
FIG. 4 shows the structure of a FinXML "External Party" element in an embodiment of the present invention.

FIG. 4 illustrates the structure of the External Party element 700, which represents an external party to a transaction. Each external party can be either a "disclosed party" or an "undisclosed party". In the present embodiment of this invention, External Party element 700 has the following XML definition:

```
<!ELEMENT externalParty ((disclosedParty |undisclosedParty)) >
<!ATTLIST externalParty id ID #IMPLIED type CDATA #IMPLIED >
```

Disclosed Party element 705 represents a party to a transaction (e.g., a Member) whose details, including corporate identification, are fully known to the other party to the transaction. Each Disclosed Party element 705 includes the following sub-elements (described in greater detail below in the discussion regarding "Reference Data" elements): Organization 710, Contact Information 730, Address 765, and Credit Rating 805. In the present embodiment of this invention, Disclosed Party element 705 has the following XML definition:

```
<!ELEMENT disclosedParty (organization, contactInformation*, address,
creditRating+ )>
```

Undisclosed Party element 835 represents a party that remains anonymous to the other party; the only information disclosed is the party's credit rating. Thus, each Undisclosed Party element 835 includes the Credit Rating 805 element (described in greater detail below in the discussion regarding "Reference Data" elements). In the present embodiment of this invention, Undisclosed Party element 805 has the following XML definition:

```
<!ELEMENT undisclosedParty (creditRating+ )>
```

Figure 5:
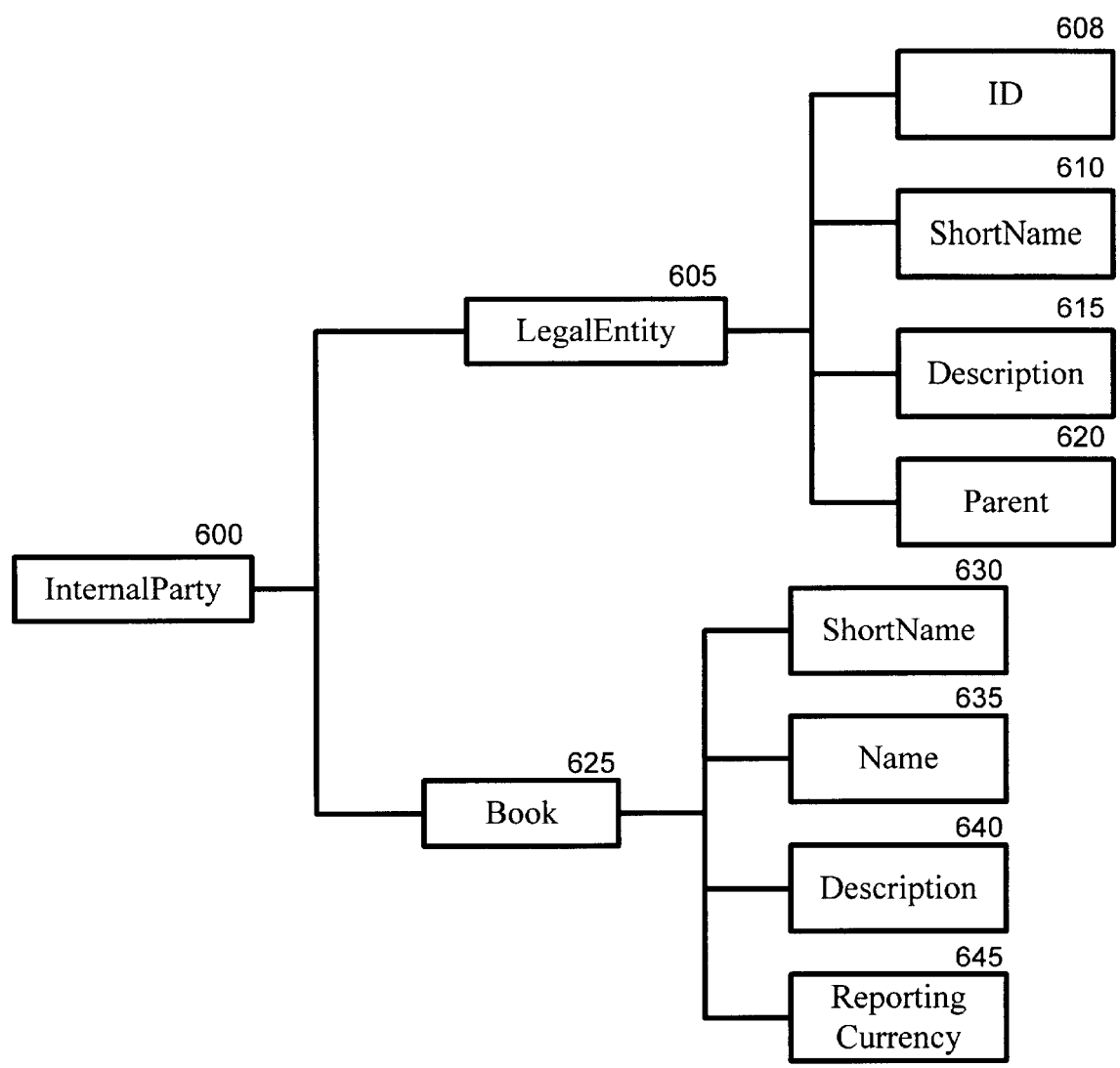
FIG. 5 shows the structure of a FinXML "Internal Party" element in an embodiment of the present invention.

FIG. 5 illustrates the structure of the Internal Party element 600, which represents an internal party to a transaction. Internal Party element 600 includes Legal Entity element 605, which represents each of the separate legal (i.e., corporate) entities associated with the internal party, and Book element 625, which represents the trading book(s) in which a party will group transactions for accounting purposes (described in greater detail below in the discussion regarding "Reference Data" elements). In the present embodiment of this invention, Internal Party element 600 has the following XML definition:

```
<!ELEMENT internalParty (legalEntity? , book? )>
<!ATTLIST internalParty id ID #IMPLIED type CDATA #IMPLIED >
```

(b) Trade Type Elements

As shown in FIG. 3, Trade element 500 includes Trade Type element 530. Each Trade Type element 530, in turn, includes a Trade Type sub-element that describes one type of financial transaction or trade.

(1) Foreign Exchange Spot

A Foreign Exchange Spot ("FX Spot") transaction is one in which one party acquires a specified quantity of one currency in exchange for another currency from another party, to be paid or settled as soon as is standard (i.e., usually two days) in the foreign exchange market. For example, a Member buys from a Provider 2 million Euro for U.S. Dollars to be paid in two days.

The FX Spot element represents such a transaction and includes the following sub-elements and attributes:

"Dealt Amount": the specified amount of currency to be converted into the currency being acquired.

"Settled Amount": the amount of currency being acquired.

"Trade Date": the date on which the currency trade has been agreed to by the parties.

"Value Date": the date on which the traded currencies will be exchanged (i.e., the trade will be settled).

"FX Rate": the foreign exchange rate at which the trade will be executed.

"Base Currency": the currency against which the currency to be acquired will be measured.

"Base Units": the number of units of the Base Currency against which the currency to be acquired will be quoted (usually one unit).

"Quote Currency": the currency to be acquired or the currency to which the quote is pegged.

"Quote Units": the number of units of the Quote Currency to be acquired.

In the present embodiment of this invention, the FX Spot element has the following XML definition:

```
<!-- Foreign Exchange Trades - FXSPOT -->
<!ENTITY % fxTradeSpec "%trade.elements;
        , dealtAmount
        , settledAmount">
<!ELEMENT fxSpot (%fxTradeSpec; )>
<!ELEMENT dealtAmount (currency, amount )>
<!ATTLIST dealtAmount %payReceiver;>
<!ELEMENT settledAmount (currency, (fxRate | amount ) )>
<!ATTLIST settledAmount %payReceiver;>
<!ELEMENT fxRate (baseCurrency, baseUnits, quoteCurrency,
quoteUnits, rate )>
<!ELEMENT baseCurrency (#PCDATA )>
<!ELEMENT baseUnits (#PCDATA )>
<!ELEMENT quoteCurrency (#PCDATA )>
<!ELEMENT quoteUnits (#PCDATA )>
<!ENTITY % trade.elements "tradeDate
        , settlementDate?
        , valueDate?
        , externalID?">
```

(2) Foreign Exchange Forward

A Foreign Exchange Forward ("FX Forward") transaction is one in which one party acquires a quantity of one currency in exchange for a specified amount of another currency from another party, with the amounts to be paid on a specified future date. For example, a Member buys from a Provider 2 million Euro for U.S. Dollars to be paid 60 days from the trade date.

The FX Forward element represents such a transaction and includes the following sub-elements and attributes:

"Dealt Amount": the specified amount of currency to be converted into the currency being acquired.

"Settled Amount" the amount of currency being acquired.

"Trade Date": the date on which the currency trade has been agreed to by the parties.

"Value Date": the date on which the traded currencies will be exchanged (i.e., the trade will be settled).

"FX Rate": the foreign exchange rate at which the trade will be executed.

"Base Currency": the currency against which the currency to be acquired will be measured.

"Base Units": the number of units of the Base Currency against which the currency to be acquired will be quoted (usually one unit).

"Quote Currency": the currency to be acquired or the currency to which the quote is pegged.

"Quote Units": the number of units of the Quote Currency to be acquired.

In the present embodiment of this invention, the FX Forward element has the following XML definition:

```
<!-- Foreign Exchange Trades - FORWARD -->
<!ENTITY % fxTradeSpec "%trade.elements;
        , dealtAmount
        , settledAmount">
<!ELEMENT fxForward (%fxTradeSpec; )>
<!ELEMENT dealtAmount (currency, amount )>
<!ATTLIST dealtAmount %payReceiver;>
<!ELEMENT settledAmount (currency, (fxRate | amount ) )>
<!ATTLIST settledAmount %payReceiver;>
<!ELEMENT fxRate (baseCurrency, baseUnits, quoteCurrency,
quoteUnits, rate )>
<!ELEMENT baseCurrency (#PCDATA )>
<!ELEMENT baseUnits (#PCDATA )>
<!ELEMENT quoteCurrency (#PCDATA )>
<!ELEMENT quoteUnits (#PCDATA )>
<!ENTITY % trade.elements "tradeDate
        , settlementDate?
        , valueDate?
        , externalID?">
```

(3) Interest Rate Fixed-Float Swap

An Interest Rate Fixed-Float Swap is a type of interest rate swap in which two parties exchange periodic payment streams, where one payment stream is based on a fixed interest rate and the other payment stream is based on a floating rate index (e.g., LIBOR), with each payment stream in the same currency. For example, a Member buys from a Provider a fixed payment stream in Euro in exchange for a floating payment stream in Euro based on the LIBOR index.

The Interest Rate Fixed-Float Swap element represents such a transaction and includes the following sub-elements and attributes:

"Trade Date": the date on which the trade has been agreed to by the parties.

"Start Date": the date on which the exchanged payments will begin.

"End Date": the date on which the exchanged payments will end.

"Fixed Leg Details": the details of the fixed interest payments for the fixed leg.

"Float Leg Details": the details of the floating interest payments for the floating leg.

"Events": the various payment and calculation events in the swap transaction, including cash payment, principal payment, interest payment, interest calculation, compound interest calculation, and interest rate reset information.

In the present embodiment of this invention, the Interest Rate Fixed-Float Swap element has the following XML definition:

```
<!-- Interest Rate Fixed Float Swap -->
<!ELEMENT interestRateFixedFloatSwap (tradeDate, startDate, endDate,
externalID?, fixedLegDetails, floatLegDetails, events?)>
```

(4) Interest Rate Float-Float Swap

An Interest Rate Float-Float Swap is a type of interest rate swap in which two parties exchange periodic payment streams, where each payment stream is based on a floating rate index (e.g., LIBOR), with each payment stream in the same currency. For example, a Member buys from a Provider a floating payment stream in Euro in exchange for a floating payment stream in Euro, where each payment stream is based on the LIBOR index.

The Interest Rate Float-Float Swap element represents such a transaction and includes the following sub-elements and attributes:

"Trade Date": the date on which the trade has been agreed to by the parties.

"Start Date": the date on which the exchanged payments will begin.

"End Date": the date on which the exchanged payments will end.

"Float Leg Details": the details of the floating interest payments; separate information for each of the two floating legs.

"Events": the various payment and calculation events in the swap transaction, including cash payment, principal payment, interest payment, interest calculation, compound interest calculation, and interest rate reset information.

In the present embodiment of this invention, the Interest Rate Float-Float Swap element has the following XML definition:

```
<!-- Interest Rate Float Float Swap -->
<!ELEMENT interestRateFloatFloatSwap (tradeDate, startDate, endDate,
externalId?, floatLegDetails, floatLegDetails, events?)>
```

(5) Cap

A Cap transaction is one in which one party, in exchange for a premium payment, acquires from another party the right to receive a payment stream from the other party with respect to a specified quantity of one currency if, on the scheduled payment dates, the level of a specified rate or index exceeds an agreed "strike rate" for the period involved. For example, a Member purchases from a Provider an interest rate cap at a strike rate of 8 percent on U.S. Dollars based on the 3-month LIBOR for a period of 12 months, in order to hedge its exposure to increasing interest rates on a 10 million U.S. Dollars floating-rate loan based on the 3-month LIBOR.

The Cap element represents such a transaction and includes the following sub-elements and attributes:

"Cap Floor Spec": describes the structured elements common to Cap and Floor transactions.

"Trade Date": the date on which the trade has been agreed to by the parties.

"Settlement Date": the date on which the trade will be settled.

"Start Date": the beginning date of the period for which the interest rate is protected.

"End Date": the date on which the payment stream will end.

"Premium Details": the details of the premium to be paid, as either a percentage ("Premium Percentage") or a specified amount ("Premium Amount"), and the payment date ("Premium Date").

"Strike Rate": the rate that, if exceeded, will trigger the settlement of the transaction.

"Buyer": the buyer of the option to be exercised; this is a reference to a Counterparty element.

"Writer": the recipient of the premium for the option to be exercised; this is a reference to a Counterparty element.

"Volatility Spread": the spread over the volatility calculated using the volatility surface; an additional spread for pricing the cap transaction.

"Discount Curve": the definition of the discount curve used to calculate the payment stream.

"Forecast Curve": the definition of the forecast curve used to calculate the payment stream.

"Notional Amount": the amount used as the basis for calculating the payment stream.

"Floating Interest Rate": the floating interest rate.

"First Fixing Rate": the interest rate to be used for the first interest calculation period.

"Day Count": the day-count method to be used for calculating interest.

"Payment Frequency": the frequency of interest/principal payment.

"Roll Date": the specific day each month to be used for payment/settlement of interest/principal.

"Payment Calendar": the calendar to be used for reference to business holidays.

"Rate Reset Calendar": the calendar to be used for reference to business holidays for interest rate resets.

"Date Stub": an indicator for an irregular schedule of payments.

"Anchor Date": the date to which the payment schedule is anchored, i.e., the end date of the first interest period or specific date of first payment; could be the start of the last interest period if dates generated in reverse.

"Amortization Details": details regarding how the payment cashflow should be amortized, including amortization method (em, single payment at end, equal payments over term of stream).

"Compounding Details": details regarding how the interest should be compounded, including calculation frequency and rate.

In the present embodiment of this invention, the Cap element has the following XML definition:

```
<!-- Cap -->
<!ENTITY % capFloorSpec "premium details
            , strikeRate
            , volatilitySpread
            , discountCurve?
            , forecastCurve?">
<!ELEMENT cap (tradeDate, settlementDate?, startDate, endDate,
externalID?,
      %genericSpecDetails; , %floatRateDetails; , %capFloorSpec; ,
      events? )>
<!ATTLIST cap buyer IDREF #REQUIRED writer IDREF #REQUIRED>
<!ELEMENT premiumDetails ( (premiumPercentage | premiumAmount ) ,
premiumDate )>
<!ELEMENT premiumAmount (%currencyAmount; )>
<!ATTLIST premiumAmount %payReceiverAmount;>
<!ELEMENT premiumPercentage (#PCDATA )*>
<!ATTLIST premiumPercentage %payReceiverAmount;>
<!ELEMENT volatilitySpread (#PCDATA )>
<!ELEMENT discountCurve (#PCDATA )>
<!ELEMENT forecastCurve (#PCDATA )>
```

(6) Floor

A Floor transaction is one in which one party, in exchange for a premium payment, acquires from another party the right to receive a payment stream from the other party with respect to a specified quantity of one currency if, on the scheduled payment dates, the level of a specified rate or index is less than an agreed "strike rate" for the period involved. For example, a Member purchases from a Provider an interest rate floor at a strike floor level of 8 percent on U.S. Dollars based on the 3-month LIBOR for a period of 12 months, in order to protect its investment returns on a 10 million U.S. Dollars money market investment based on the 3-month LIBOR.

The Floor element represents such a transaction and includes the following sub-elements and attributes:

"Cap Floor Spec": describes the structured elements common to Cap and Floor transactions.

"Trade Date": the date on which the trade has been agreed to by the parties.

"Settlement Date": the date on which the trade will be settled.

"Start Date": the beginning date of the period for which the interest rate is protected.

"End Date": the date on which the payment stream will end.

"Premium Details": the details of the premium to be paid, as either a percentage ("Premium Percentage") or a specified amount ("Premium Amount"), and the payment date ("Premium Date").

"Strike Rate": the rate that, if exceeded, will trigger the settlement of the transaction.

"Buyer": the buyer of the option to be exercised; this is a reference to a Counterparty element.

"Writer": the recipient of the premium for the option to be exercised; this is a reference to a Counterparty element.

"Volatility Spread": the spread over the volatility calculated using the volatility surface; an additional spread for pricing the cap transaction.

"Discount Curve": the definition of the discount curve used to calculate the payment stream.

"Forecast Curve": the definition of the forecast curve used to calculate the payment stream.

"Notional Amount": the amount used as the basis for calculating the payment stream.

"Floating Interest Rate": the floating interest rate.

"First Fixing Rate": the interest rate to be used for the first interest calculation period.

"Day Count": the day-count method to be used for calculating interest.

"Payment Frequency": the frequency of interest/principal payment.

"Roll Date": the specific day each month to be used for payment/settlement of interest/principal.

"Payment Calendar": the calendar to be used for reference to business holidays.

"Rate Reset Calendar": the calendar to be used for reference to business holidays for interest rate resets.

"Date Stub": an indicator for an irregular schedule of payments.

"Anchor Date": the date to which the payment schedule is anchored, i.e., the end date of the first interest period or specific date of first payment; could be the start of the last interest period if dates generated in reverse.

"Amortization Details": details regarding how the payment cashflow should be amortized, including amortization method (e.g., single payment at end, equal payments over term of stream).

"Compounding Details": details regarding how the interest should be compounded, including calculation frequency and rate.

In the present embodiment of this invention, the Floor element has the following XML definition:

```
<!-- Floor -->
<!ENTITY % capFloorSpec "premium details
            , strikeRate
            , volatilitySpread
            , discountCurve?
            , forecastCurve?">
<!ELEMENT floor (tradeDate, settlementDate?, startDate, endDate,
externalID?,
      %genericSpecDetails; , %floatRateDetails; , %capFloorSpec; ,
      events? )>
<!ATTLIST floor buyer IDREF #REQUIRED writer IDREF
#REQUIRED>
<!ELEMENT premiumDetails ( (premiumPercentage | premiumAmount) ,
premiumDate)>
<!ELEMENT premiumAmount (%currencyAmount; )>
<!ATTLIST premiumAmount %payReceiverAmount;>
<!ELEMENT premiumPercentage (#PCDATA )*>
<!ATTLIST premiumPercentage %payReceiverAmount;>
<!ELEMENT volatilitySpread (#PCDATA )>
<!ELEMENT discountCurve (#PCDATA )>
<!ELEMENT forecastCurve (#PCDATA )>
```

(7) Fixed Rate Loan/Deposit

A Fixed Rate Loan/Deposit transaction is one in which one party borrows a sum of money from another party at a fixed interest rate. For example, a Member borrows from a Provider 1 million U.S. Dollars at a fixed interest rate for one year.

The Fixed Loan/Deposit element represents such a transaction and includes the following sub-elements and attributes:

"Trade Date": the date on which the loan has been agreed to by the parties.

"Start Date": the date on which the loan will begin.

"End Date": the date on which the loan will end.

"Lender": the lender of the loan; this is a reference to a counterparty element.

"Borrower": the borrower of the loan; this is a reference to a Counterparty element.

"Notional Amount": the loan amount.

"Fixed Interest Rate": the fixed interest rate.

"Day Count": the day-count method to be used for calculating interest.

"Payment Frequency": the frequency of interest/principal payment.

"Roll Date": the specific day each month to be used for payment/settlement of interest/principal.

"Payment Calendar": the calendar to be used to generate payment dates.

"Date Stub": an indicator for an irregular schedule of loan payments.

"Anchor Date": the date to which the payment schedule is anchored, i.e., the end date of the first interest period or specific date of first payment; could be the start of the last interest period if dates generated in reverse.

"Amortization Details": details regarding how the loan payment cashflow should be amortized, including amortization method (e.g., single payment at end, equal payments over term of loan).

"Compounding Details": details regarding how the loan interest should be compounded, including calculation frequency and rate.

In the present embodiment of this invention, the Fixed Loan deposit element has the following XML definition:

```
<!-- Loan and Deposit -->
<!ELEMENT fixedLoan (tradeDate, startDate, endDate, externalId?,
%genericSpecDetails;
       , %fixedRateDetails; , events? )>
<!ATTLIST fixedLoan lender IDREF #REQUIRED
       borrower IDREF #REQUIRED>
<!ELEMENT fixedDeposit (tradeDate, startDate, endDate, externalId?,
%genericSpecDetails;
       , %fixedRateDetails; , events? )>
<!ATTLIST fixedDeposit lender IDREF #REQUIRED
       borrower IDREF #REQUIRED>
<!ENTITY % genericSpecDetails "notionalAmount
       , dayCount
       , paymentFrequency
       , rollDate
       , anchorDate?
       , paymentCalendar
       , dateStub
       , amortizationDetails?
       , compoundingDetails?">
<!ENTITY % fixedRateDetails " (fixedInterestRate
       | fxRate)">
```

(8) Floating Rate Loan/Deposit

A Floating Rate Loan/Deposit transaction is one in which one party borrows a sum of money from another party at a variable interest rate, generally based on a floating rate index (e.g., London Interbank Offered Rate or "LIBOR"). For example, a Member borrows from a Provider 1 million U.S. Dollars at a variable interest rate for two years.

The Floating Loan/Deposit element represents such a transaction and includes the following sub-elements and attributes:

"Trade Date": the date on which the loan has been agreed to by the parties.

"Start Date": the date on which the loan will begin.

"End Date": the date on which the loan will end.

"Lender": the lender of the loan; this is a reference to a Counterparty element.

"Borrower": the borrower of the loan; this is a reference to a Counterparty element.

"Notional Amount": the loan amount.

"Floating Interest Rate": the floating interest rate.

"First Fixing Rate": the interest rate to be used for the first interest calculation period.

"Day Count": the day-count method to be used for calculating interest.

"Payment Frequency": the frequency of interest/principal payment.

"Roll Date": the specific day each month to be used for payment/settlement of interest/principal.

"Payment Calendar": the calendar to be used to generate payment dates.

"Rate Reset Calendar": the calendar to be used for reference to business holidays for interest rate resets.

"Date Stub": an indicator for an irregular schedule of loan payments.

"Anchor Date": the date to which the payment schedule is anchored, i e., the end date of the first interest period or specific date of first payment; could be the start of the last interest period if dates generated in reverse.

"Amortization Details": details regarding how the loan payment cashflow should be amortized, including amortization method (em, single payment at end, equal payments over term of loan).

"Compounding Details": details regarding how the loan interest should be compounded, including calculation frequency and rate.

In the present embodiment of this invention, the Floating Loan/Deposit element has the following XML definition:

```
<!-- Loan and Deposit -->
<!ELEMENT floatLoan (tradeDate, startDate, endDate, externalId?,
%genericSpecDetails; ,
       %floatRateDetails; , events? )>
<!ATTLIST floatLoan lender IDREF #REQUIRED
       borrower IDREF #REQUIRED>
<!ELEMENT floatDeposit (tradeDate, startDate, endDate, externalId?,
%genericSpecDetails;
       , %floatRateDetails; , events? )>
<!ATTLIST floatDeposit lender IDREF #REQUIRED
       borrower IDREF #REQUIRED>
<!ENTITY % genericSpecDetails "notionalAmount
       , dayCount
       , paymentFrequency
       , rollDate
       , anchorDate?
       , paymentCalendar
       , dateStub
       , amortizationDetails?
       , compoundingDetails?">
<!ENTITY % floatRateDetails "floatingInterestRate
       , firstFixingRate?
       , rateResetCalendar">
```

(9) Foreign Exchange Option

A Foreign Exchange Option ("FX Option") transaction is one in which one party, in exchange for a premium payment, acquires from another party the right, but not the obligation, to buy (i.e., exercise a put option) or sell (i.e., exercise a call option) a specified quantity of one currency at a specified price on a specified exercise date or during a specified exercise period. For example, a Member pays a premium to a Provider for the right to exercise an option to purchase 1 million Euro for a set price in U.S. Dollars in three months.

The FX Option element represents such a transaction and includes the following sub-elements and attributes:

"Settlement Date": the date on which the trade will be settled.

"Premium Details": the details of the premium to be paid, as either a percentage ("Premium Percentage") or a specified amount ("Premium Amount"), and the payment date ("Premium Date").

"Expiration Date": the expiration date by which the option must be exercised.

"Dealt Amount": the specified amount of currency to be converted into the currency to be bought or sold upon exercise of the option.

"Settled Amount": the amount of currency to be bought or sold upon exercise of the option.

"Delivery Date": the date on which either the cash difference or the underlying contract nominal amount must be exchanged upon exercise of the option.

"Delivery Mode": indicator of whether the cash difference ("Cash") or the underlying contract nominal amount ("Physical") must be exchanged upon exercise of the option.

"Option Type": the type of option to be exercised ("Put" or "Call").

"Volatility": the definition of the volatility surface used to calculate the option premium.

"Buyer": the buyer of the option to be exercised; this is a reference to a Counterparty element.

"Writer": the recipient of the premium for the option to be exercised; this is a reference to a Counterparty element.

In the present embodiment of this invention, the FX Option element has the following XML definition:

```
<!-- FX Option -->
<!ENTITY % fxOptionSpec "tradeDate
        , settlementDate
        , externalId?
        , premiumDetails
        , expirationDate
        , deliveryDate
        , optionType
        , dealtAmount
        , strikeRate?
        , settledAmount
        , deliveryMode
        , volatility?">
<!ELEMENT fxOption (%fxOptionSpec; )>
<!ATTLIST fxOption buyer IDREF #REQUIRED writer IDREF #REQUIRED>
<!ELEMENT optionType (call | put )>
<!ELEMENT deliveryMode (physical | cash )>
<!ELEMENT volatility (#PCDATA )>
<!ELEMENT call (#PCDATA )>
<!ELEMENT put (#PCDATA )>
<!ELEMENT physical EMPTY>
<!ELEMENT cash EMPTY>
```

(10) Foreign Exchange Swap

A Foreign Exchange Swap ("FX Swap") transaction is one in which two parties exchange periodic payment streams, each in a different currency. The first payment stream is delivered at the beginning of the transaction period and the second payment is delivered at the end of the transaction period. The payments may be based upon a specified interest rate. For example, a Member buys a payment stream of 3 million Euro from a Provider in exchange for a payment stream of 1 million U.S. Dollars to be paid six months after the first payment stream.

The FX Swap element represents such a transaction and includes the following sub-elements and attributes:

"Trade Date": the date on which the trade has been agreed to by the parties.

"Near Leg Value Date": the date on which the final payment of the first leg (the "Near Leg") of the swap will be paid.

"Far Leg Value Date": the date on which the final payment of the second leg (the "Far Leg") of the swap will be paid.

"Notional Amount": the amount used as the basis for calculating the payment streams to be exchanged.

"Near Leg Settled Amount": the amount that will be paid under the Near Leg; alternative to Near Leg FXRate.

"Near Leg FXRate": the foreign exchange rate of the Near Leg; alternative to Near Leg Settled Amount.

Far Leg Settled Amount": the amount that will be paid under the Far Leg; alternative to Far Leg FXRate.

Far Leg FXRate": the foreign exchange rate of the Far Leg; alternative to Far Leg Settled Amount.

In the present embodiment of this invention, the FX Swap element has the following XML definition:

```
<!-- FX Swap -->
<!ENTITY % fxSwapSpec "tradeDate
        , externalId?
        , nearLegValueDate
        , farLegValueDate
        , notionalAmount
        , (nearLegFxRate | nearLegSettledAmount )
        , (farLegFXRate |farLegSettledAmount )">
<!ELEMENT FXSwap (%fxSwapSpec; )>
<!ELEMENT nearLegValueDate (#PCDATA )>
<!ELEMENT farLegValueDate (#PCDATA )>
<!ELEMENT nearLegFXRate (fxRate )>
<!ELEMENT farLegFXRate ( fxRate )>
<!ELEMENT nearLegSettledAmount (%currencyAmount; )>
<!ATTLIST nearLegSettledAmount %payReceiver;>
<!ELEMENT farLegSettledAmount (%currencyAmount; )>
<!ATTLIST farLegSettledAmount %payReceiver;>
```

(11) Cross-Currency Fixed-Fixed Swap

A Cross-Currency Fixed-Fixed Swap is a type of interest rate swap in which two parties exchange periodic payment streams based on fixed interest rates each in a different currency.

The Cross-Currency Fixed-Fixed Swap element represents such a transaction and includes the following sub-elements and attributes:

"Trade Date": the date on which the trade has been agreed to by the parties.

"Start Date": the date on which the exchanged payments will begin.

"End Date": the date on which the exchanged payments will end.

"Notional Amount": the amount used as the basis for calculating the payment streams to be exchanged.

"Fixed Leg Details": the details of the fixed interest payments; separate information for each of the two fixed legs.

"Events": the various payment and calculation events in the swap transaction, including cash payment, principal payment, interest payment, interest calculation, compound interest calculation, and interest rate reset information.

In the present embodiment of this invention, the Cross-Currency Fixed-Fixed Swap element has the following XML definition:

```
<!-- Cross Currency Fixed Fixed Swap -->
<!ELEMENT crossCurrencyFixedFixedSwap (%tenor.elements; ,
fixedLegDetails , fixedLegDetails , events?)>
<!ATTLIST crossCurrencyFixedFixedSwap notionalAmount (Yes | No )
#REQUIRED>
```

(12) Cross-Currency Float-Float Swap

A Cross-Currency Float-Float Swap is a type of interest rate swap in which two parties exchange periodic payment streams based on a floating rate index (e.g., LIBOR), each in a different currency.

The Cross-Currency Float-Float Swap element represents such a transaction and includes the following sub-elements and attributes:

"Trade Date": the date on which the trade has been agreed to by the parties.

"Start Date": the date on which the exchanged payments will begin.

"End Date": the date on which the exchanged payments will end.

"Notional Amount": the amount used as the basis for calculating the payment streams to be exchanged.

"Float Leg Details": the details of the floating interest payments; separate information for each of the two fixed legs.

"Events": the various payment and calculation events in the swap transaction, including cash payment, principal payment, interest payment, interest calculation, compound interest calculation, and interest rate reset information.

In the present embodiment of this invention, the Cross-Currency Float-Float Swap element has the following XML definition:

```
<!-- Cross Currency Float Float Swap -->
<!ELEMENT crossCurrencyFloatFloatSwap (%tenor.elements; ,
floatLegDetails , floatLegDetails , events?)>
<!ATTLIST crossCurrencyFloatFloatSwap notionalAmount (Yes | No )
#REQUIRED>
```

(13) Cross-Currency Fixed-Float Swap

A Cross-Currency Fixed-Float Swap is a type of interest rate swap in which two parties exchange periodic payment streams, where one payment stream is based on a fixed interest rate and the other payment stream is based on a floating rate index (e.g., LIBOR), each in a different currency.

The Cross-Currency Fixed-Float Swap element represents such a transaction and includes the following sub-elements and attributes:

"Trade Date": the date on which the trade has been agreed to by the parties.

"Start Date": the date on which the exchanged payments will begin.

"End Date": the date on which the exchanged payments will end.

"Notional Amount": the amount used as the basis for calculating the payment streams to be exchanged.

"Fixed Leg Details": the details of the fixed interest payments for the fixed leg.

"Float Leg Details": the details of the floating interest payments for the floating leg.

"Events": the various payment and calculation events in the swap transaction, including cash payment, principal payment, interest payment, interest calculation, compound interest calculation, and interest rate reset information.

In the present embodiment of this invention, the Cross-Currency Fixed-Float Swap element has the following XML definition:

```
<!-- Cross Currency Fixed Float Swap -->
<!ELEMENT CrossCurrencyFixedFloatSwap (%tenor.elements; ,
fixedLegDetails, floatLegDetails, events?)>
<!ATTLIST crossCurrencyFixedFloatSwap notionalAmount (Yes | No )
#REQUIRED>
```

(14) Forward Rate Agreement

A Forward Rate Agreement transaction is one in which one party buys a single floating rate payment in exchange for a single fixed rate payment. The fixed rate payment amount is determined by applying a fixed rate of interest to the notional amount of the transaction, while the floating rate payment amount is determined by sampling the value of a specified floating rate option on a specified date and applying the sampled rate to the notional amount. The parties settle the Forward Rate Agreement by netting the effects of the two payments into a single payment made by one or the other of the parties: if the floating rate amount due is greater than the fixed rate amount due, then the floating rate payer pays the excess to the fixed rate payer; conversely, if the fixed rate amount due is greater than the floating rate amount due, then the fixed rate payer pays the excess to the floating rate payer. Settlement occurs at the beginning of the transaction subject to future discounting (i.e., payment of difference in fixed and floating rates).

The Forward Rate Agreement element represents such a transaction and includes the following sub-elements and attributes:

"Trade Date": the date on which the trade has been agreed to by the parties.

"Settlement Date": the date on which payment settlement will be completed.

"Start Date": the date on which the transaction will begin.

"End Date": the date on which the transaction will end.

"Adjusted Start Date": the date on which the transaction will begin, adjusted for holidays.

"Adjusted End Date": the date on which the transaction will end, adjusted for holidays.

"Notional Amount": the amount used as the basis for calculating the payments to be exchanged.

"Fixed Interest Rate": the fixed interest rate for the fixed rate payment.

"Interest Index": the details of the floating interest index to be used for the floating rate payment.

"Day Count": the day-count method to be used for calculating interest.

"Payment Frequency": the frequency of interest/principal payment.

"Roll Date": the specific day each month to be used for payment/settlement of interest/principal.

"Roll Convention": the convention to be used for rolling the payment dates in the event the date falls on a holiday.

"Holiday Calendar": the calendar to be used for reference to business holidays.

"Fixing Date": the date on which the rate to be used for settlement is fixed.

"Rate Reset Calendar": the calendar to be used for determining the dates on which to reset floating interest rates.

"Buyer": the buyer of the floating rate payment; this is a reference to a Counterparty element.

"Seller": the seller of the floating rate payment; this is a reference to a Counterparty element.

"Premium Details": the details of the premium to be paid, as either a percentage ("Premium Percentage") or a specified amount ("Premium Amount"), and the payment date ("Premium Date").

In the present embodiment of this invention, the Forward Rate Agreement element has the following XML definition:

```
<!-- Forward Rate Agreement -->
<!ELEMENT forwardRateAgreement (tradeDate, settlementDate?,
startDate, endDate,
        externalId?, adjustedStartDate, adjustedEndDate ,
        notionalAmount, dayCount, rollConvention, rollDate,
        holidayCalendar, fixedInterestRate, interestIndex,
        fixingDate, rateResetCalendar, premiumDetails? )>
<!ATTLIST forwardRateAgreement buyer IDREF #REQUIRED>
<!ATTLIST forwardRateAgreement seller IDREF #REQUIRED>
<!ELEMENT adjustedStartDate (#PCDATA )>
<!ELEMENT adjustedEndDate (#PCDATA )>
<!ELEMENT fixingDate (#PCDATA )>
```

(15) Customized Trade

In addition to the financial transactions represented by the elements described above, the present embodiment of this invention supports customized trades and transactions created by Members and/or Providers, so long as such transactions are permitted by applicable law. Such customized transactions might include hybrid trades, where one or more aspects of one type of trade are combined with those of another. For example, a party might structure a foreign exchange "swaption" in which a stream of periodic payments in one currency is exchanged for the right to buy a specified quantity of another currency at a specified price on a specified date.

FinXML enables the representation of customized transactions through the combination of elements that comprise different types of transactions. Using FinXML, a party can specify the element fields and values that it wishes to comprise the particular customized transactions. The Customized Trade element represents such a transaction and includes the following sub-elements and attributes:

"Field Name": a particular component included in the transaction; separate information for each component; paired with "Field Value".

"Field Value": the value of a particular component included in the transaction; separate information for each component; paired with "Field Name".

"Buyer": the buyer of the customized trade; this is a reference to a Counterparty element.

"Seller": the seller of the customized trade; this is a reference to a Counterparty element.

In the present embodiment of this invention, the Customized Trade element has the following XML definition:

```
<!-- Customized Trade -->
<!ELEMENT customizedTrade ( (fieldName, fieldValue ) * )>
<!ATTLIST customizedTrade buyer IDREF #REQUIRED>
<!ATTLIST customizedTrade seller IDREF #REQUIRED>
<!ELEMENT fieldName (#PCDATA )>
<!ELEMENT fieldValue (#PCDATA )>
```

(c) Trade Specific Elements

In the present embodiment of this invention, FinXML includes a number of elements that represent details common to one or more of the Trade Type elements 530. Such elements may also be included in customized trades.

(1) Generic Trade Details

Generic trade details include information relating to notional amounts and interest rate, amortization, and compounding calculations that are common to different types of trades. The "Generic Spec Details" element represents such information and includes the following sub-elements and attributes:

"Notional Amount": the transaction amount.

"Day Count": the day-count method to be used for calculating interest.

"Payment Frequency": the frequency of interest/principal payment (e.g., monthly, quarterly, semi-annually).

"Roll Date": the specific day each month to be used for payment/settlement of interest/principal.

"Anchor Date": the date to which the payment schedule is anchored, i.e., the end date of the first interest period or specific date of first payment.

"Payment Calendar": the calendar to be used for reference to business holidays.

"Date Stub": an indicator for a schedule of loan payments in which the payment period differs (i.e., is offset from the start of ) from all other payment periods.

"Amortization Details": details regarding how the loan payment cashflow should be amortized, including amortization method (e.g., single payment at end, equal payments over term of loan).

"Compounding Details": details regarding how the loan interest should be compounded, including calculation frequency and rate.

In the present embodiment of this invention, the Generic Spec Details element has the following XML, definition:

```
<!ENTITY % genericSpecDetails "notionalAmount
        , dayCount
        , paymentFrequency
        , rollDate
        , anchorDate?
        , paymentCalendar
```

```
, dateStub
, amortizationDetails?
, compoundingDetails?">
```

(2) Fixed Rate Details

Fixed rate details include information relating to fixed interest rates. The "Fixed Spec Details" element represents such information and includes the following sub-elements and attributes:

"Fixed Interest Rate": the fixed interest rate.

"FX Rate": the foreign exchange rate at which a trade will be executed.

In the present embodiment of this invention, the Fixed Spec Details element has the following XML definition:

```
<!ENTITY % fixedSpecDetails "fixedInterestRate | fxRate">
```

(3) Floating Rate Details

Floating rate details include information relating to floating interest rates that are based on a floating rate index (e.g., LIBOR). The "Floating Spec Details" element represents such information and includes the following sub-elements and attributes:

"Floating Interest Rate": the floating interest rate. "First Fixing Rate": the interest rate to be used for the first interest calculation period.

"Rate Reset Calendar": the calendar to be used for reference to business holidays for interest rate resets.

In the present embodiment of this invention, the Floating Spec Details element has the following XML definition:

```
<!ENTITY % floatingSpecDetails "floatingInterestRate, firstFixingRate?, rateResetCalendar">
```

(4) Fixed Leg Details

A number of the transactions described above include multiple "legs," where each leg is a series of payments or cashflows. Such legs can be "fixed" or "floating."

A "fixed leg" is a payment stream based on a fixed interest rate. The "Fixed Leg Details" elements represents information regarding the fixed leg of a trade and includes generic trade details (described above in "Generic Spec Details" element), fixed rate details (described above in "Fixed Spec Details" element), financial events details (described below in "Events" element), and the following additional sub-elements and attributes:

"Leg ID": identifier of a particular leg of a trade.

"Payer": the payer of the fixed leg in a trade; this is a reference to a Counterparty element.

"Receiver": the recipient of the proceeds of the fixed leg in a trade; this is a reference to a Counterparty element.

In the present embodiment of this invention, the Fixed Leg Details element has the following XML definition:

```
<!ELEMENT fixedLegDetails (%genericSpecDetails; ,
%fixedRateDetails; , events? )>
<!ATTLIST fixedLegDetails legID ID #REQUIRED >
<!ATTLIST fixedLegDetails payer IDREF #REQUIRED >
<!ATTLIST fixedLegDetails receiver IDREF #REQUIRED >
```

(5) Floating Leg Details

A "floating leg" is a payment stream based on a floating interest rate. The "Float Leg Details" elements represents information regarding the floating leg of a trade and includes generic trade details (described above in "Generic Spec Details" element), floating rate details (described above in "Float Spec Details" element), financial event details (described below in "Events" element), and the following additional sub-elements and attributes:

"Leg ID": identifier of a particular leg of a trade.

"Payer": the payer of the floating leg in a trade; this is a reference to a Counterparty element.

"Receiver": the recipient of the proceeds of the floating leg in a trade; this is a reference to a Counterparty element.

In the present embodiment of this invention, the Float Leg Details element has the following XML definition:

```
<!ELEMENT floatLegDetails (GenericSpecDetails; , %floatRateDetails; ,
event ,>
<!ATTLIST floatLegDetails legID ID #REQUIRED >
<!ATTLIST floatLegDetails payer IDREF #REQUIRED >
<!ATTLIST floatLegDetails receiver IDREF #REQUIRED >
```

(d) Financial Event Elements

Figure 6:
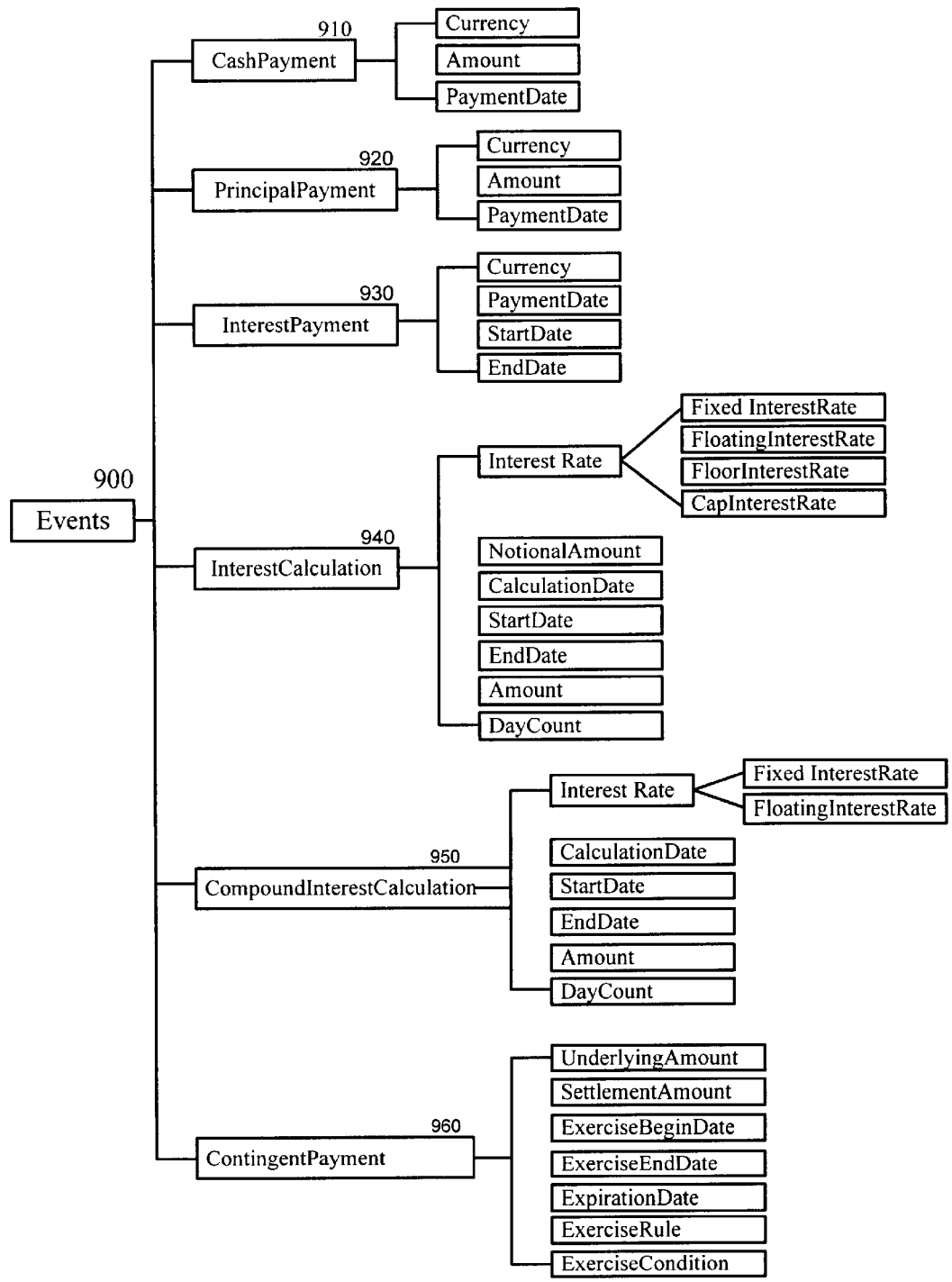
FIG. 6 shows the structure of a FinXML "Events" element in an embodiment of the present invention.

In the present embodiment of this invention, FinXML includes a number of elements that represent details common to certain Trade Type elements 530, including customized trades, that relate to optional events during the life cycle of a trade such as premium payment, interest payment, contingent payment, and interest calculation. "Events" element 900, shown in FIG. 6, describes such information and includes the following sub-elements: "Cash Payment" 910, "Principal Payment" 920, "Interest Payment" 930, "Interest Calculation" 940, "Compound Interest Calculation" 950, and "Contingent Payment" 960.

In the present embodiment of this invention, Events element 900 has the following XML definition:

```
<!ELEMENT events ((cashPayment | principalPayment | interestPayment |
contingentPayment | interestCalculation |
compoundInterestCalculation )+ )>
<!ATTLIST events id ID #IMPLIED >
```

(1) Cash Payment

Cash Payment element 910 describes information relating to cash payments to be made as a part of certain trades, and includes the following sub-elements and attributes:

"Currency": the currency of the cash payment.

"Amount": the amount of the cash payment.

"Payment Date": the date on which the cash payment is to be made.

"ID": the identifier of the particular cash payment.

"Type": the indicator of type of payment (e.g., "Premium" or "Fees").

"Payer": the payer of the cash payment; this is a reference to a Counterparty element.

"Receiver": the recipient of the cash payment; this is a reference to a Counterparty element.

In the present embodiment of this invention, Cash Payment element 910 has the following XML definition:

```
<!ELEMENT cashPayment (currency, amount, paymentDate )>
<!ATTLIST cashPayment id ID #REQUIRED
        type ( Premium | Fees ) #REQUIRED
        payer IDREF #REQUIRED
        receiver IDREF #REQUIRED >
```

(2) Principal Payment

Principal Payment element 920 describes information relating to principal payments to be made as a part of certain trades, and includes the following sub-elements and attributes:

"Currency": the currency of the principal payment.

"Amount": the amount of the principal payment.

"Payment Date": the date on which the principal payment is to be made.

"ID": the identifier of the particular principal payment.

"Payer": the payer of the principal payment; this is a reference to a Counterparty element.

"Receiver": the recipient of the principal payment; this is a reference to a Counterparty element.

In the present embodiment of this invention, Principal Payment element 920 has the following XML definition:

```
<!ELEMENT principalPaymentcurrency, amount, paymentDate )>
<!ATTLIST principalPayment id ID #REQUIRED
        payer IDREF #REQUIRED
        receiver IDREF #REQUIRED >
```

(3) Interest Payment

Interest Payment element 930 describes information relating to interest payments to be made as a part of certain trades, and includes the following sub-elements and attributes:

"Currency": the currency of the interest payment.

"Amount": the amount of the interest payment.

"Payment Date": the date on which the interest payment is to be made.

"Start Date": the start date of the interest period to which the interest payment pertains.

"End Date": the end date of the interest period to which the interest payment pertains.

"ID": the identifier of the particular interest payment.

"Payer": the payer of the interest payment; this is a reference to a Counterparty element.

"Receiver": the recipient of the interest payment; this is a reference to a Counterparty element.

"Interest Type": the indicator of type of interest payment (e.g., "Coupon", "Swap", "Loan", "Deposit", or "Other").

"Calculations": the identifier of the particular interest calculation periods.

In the present embodiment of this invention, Interest Payment element 930 has the following XML definition:

```
<!ELEMENT interestPayment (currency, paymentDate, startDate,
endDate )>
<!ATTLIST interestPayment id ID #REQUIRED
        payer IDREF #REQUIRED
        receiver IDREF #REQUIRED
        interestType (Coupon | Swap | Loan | Deposit | Other)
        #IMPLIED
        calculations IDREFS #REQUIRED >
```

(4) Contingent Payment

Contingent Payment element 960 describes information relating to contingent payments to be made in the settlement of certain trades after the exercise of an option, and includes the following sub-elements and attributes:

"Underlying Amount": the amount of the option-underlying instrument.

"Settlement Amount": the amount to be paid in settlement of the exercise of the option in return for the underlying instrument.

"Expiration Date": the date of expiry of the option.

"Exercise Begin Date": the first date on which the option may be exercised.

"Exercise End Date": the last date on which the option may be exercised.

"Exercise Rule": the rule governing normal exercise of the option (e.g., "American"—the option may be exercised on any day within a given period; "European"—the option may only be exercised on the option expiration date).

"Exercise Condition": any conditions that must be met to permit exercise of the option (e.g., the 3-month LIBOR rate must be greater than 4.5% on the exercise date).

"Volatility": the volatility value to be used when valuing the option.

"ID": the identify of the particular interest payment.

"Payer": the party responsible for delivering the option underlying instrument; this party will receive the settlement amount in exchange for the option underlying instrument.

"Receiver": the recipient of the option-underlying instrument; this party will pay the settlement amount as the price for exercising the option.

"Option Type": the nature of the option (e.g., "Call"—an option to buy the underlying instrument at the exercise price; "Put"—an option to sell the underlying instrument at the exercise price).

"Delivery Type": an indicator describing whether the Payer will physically deliver the option underlying instrument to the Receiver or, alternatively, that the transaction will be settled for cash where the option writer will, upon exercise, pay to the option holder the difference between the value of the underlying instrument and the exercise price.

In the present embodiment of this invention, Contingent Payment element 960 has the following XML definition:

```
<!ELEMENT contingentPayment (underlyingAmount, settlementAmount,
expirationDate, exerciseBeginDate,
exerciseEndDate, exerciseRule, exerciseCondition, volatility)>
<!ATTLIST contingentPayment id ID #REQUIRED
          payer IDREF #REQUIRED
          receiver IDREF #REQUIRED
          optionType (call | put)#REQUIRED
          deliveryType (deliverable | non-deliverable) #REQUIRED>
<!ELEMENT underlyingAmount (currency, amount)>
<!ELEMENT settlementAmount (currency, amount)>
<!ELEMENT exerciseBeginDate (#PCDATA)>
<!ELEMENT exerciseEndDate (#PCDATA)>
<!ELEMENT exerciseRule (#PCDATA)>
<!ELEMENT exerciseCondition (#PCDATA)>
<!ELEMENT volatility (#PCDATA)>
```

(5) Interest Calculation

Interest Calculation element 940 describes information relating to an interest amount calculated for a given period within a particular interest payment, and includes the following sub-elements and attributes:

"ID": the identifier of the particular interest calculation period.

"Resets": the identifier of the particular rate reset series.

"Notional Amount": the amount involved in the interest calculation.

"Calculation Date": the date on which the interest calculation is performed.

"Start Date": the start date of the interest period for which the interest calculation is to be performed.

"End Date": the end date of the interest period for which the interest calculation is to be performed.

"Amount": the calculated interest amount.

"Day Count": the day-count method to be used for performing the interest calculation.

"%InterestRate.Elements": definition of the type of interest rate involved (e.g., "Fixed" or "Floating").

In the present embodiment of this invention, Interest Calculation element 940 has the following XML definition:

```
<!ELEMENT interestCalculation ((%interestRate.elements; )?,
notionalAmount, calculationDate, startDate, endDate, amount?,
dayCount )>
  <!ATTLIST interestCalculation id ID #REQUIRED
            resets IDREFS #IMPLIED >
```

(6) Compound Interest Calculation

Compound Interest Calculation element 950 describes information relating to a compound interest amount calculated for a given period within a particular interest payment, and includes the following sub-elements and attributes:

"ID": the identifier of the particular interest calculation period.

"Rate": the identifier of the particular interest rate.

"Resets": the identifier of the particular rate reset series.

"Notional Amount": the amount involved in the compound interest calculation.

"Calculation Date": the date the compound interest calculation is performed.

"Start Date": the start date of the interest period for which the compound interest calculation is to be performed.

"End Date": the end date of the interest period for which the compound interest calculation is to be performed.

"Amount": the calculated compound interest amount.

"%InterestRate.Elements": definition of the type of interest rate involved (e.g., "Fixed" or "Floating").

In the present embodiment of this invention, Compound Interest Calculation element 950 has the following XML definition:

```
<!ELEMENT compoundInterestCalculation ((fixedInterestRate |
floatingInterestRate)?,
          calculationDate, startDate, endDate, amount)>
  <!ATTLIST compoundInterestCalculation id ID #REQUIRED
            resets IDREF #REQUIRED
            rate IDREF #IMPLIED>
```

(e) Calculation Elements

In the present embodiment of this invention, FinXML includes a number of elements that represent details regarding calculations to be performed in certain Trade Type elements 530, including customized trades. These elements relate to compounding, amortization, and calculation frequency.

(1) Compounding Details

The "Compounding Details" element describes information relating to any compounding calculations that need to be performed in a particular transaction. This typically arises when the actual interest payment frequency is less than the interest calculation frequency. For example, if interest is calculated every three months but paid every 6 months, then the interest calculated at the end of the 3-month period would be compounded and paid along with the interest calculated for the fourth through sixth months. The Compounding Details element includes the following sub-element:

"Calculation Frequency": the frequency at which interest calculations should be performed in a multi-period transaction.

In the present embodiment of this invention, the Compounding Details element has the following XML definition:

```
<!ELEMENT compoundingDetails (calculationFrequency)>
```

(2) Amortization Details

The "Amortization Details" element describes information relating to any amortization calculations that need to be performed in a particular swap transaction. If the amortization method is defined to be "bullet", principal will be paid in one lump sum at maturity, whereas under "equal" amortization, principal will be paid in equal installments during the life of the swap transaction. The Amortization Details element includes the following sub-elements and attributes:

"Amortization Frequency": the frequency at which amortization will be performed in a particular transaction (e.g., semi-annual or annual).

"Amortization Method": the amortization method (e.g., "bullet" or "equal").

In the present embodiment of this invention, the Amortization Details element has the following XML definition:

```
<!ELEMENT amortizationDetails (amortizationFrequency )>
<!ATTLIST amortizationDetails amortizationMethod %amortMethod;
#REQUIRED>
```

(3) Calculation Frequency

The "Calculation Frequency" element describes information relating to the frequency of a particular calculation to be performed. The Calculation Frequency element includes the following sub-elements and attributes:

"Convention": the particular calculation methodology based on the market convention (e.g., "IMM", "FRN", "Eurodollar", or "Normal").

"End of Month": indicator of whether the particular calculation should be moved to the end of the month.

"Term": the period of time for a single calculation period (e.g., 3-months, 6-months, etc.).

In the present embodiment of this invention, the Calculation Frequency element has the following XML definition:

```
<!ELEMENT calculationFrequency (term )>
<!ATTLIST calculationFrequency convention (IMM | FRN | Eurodollar |
Normal ) 'Normal'
        endOfMonth (Yes | No) #REQUIRED >
```

(4) Payment Frequency

The "Payment Frequency" element describes information relating to the frequency of a particular payment to be made. The Payment Frequency element includes the following sub-elements and attributes:

"Convention": the particular calculation methodology based on the market convention (e.g., "IMM", "FRN", "Eurodollar", or "Normal").

"End of Month": indicator of whether the particular payment should be moved to the end of the month.

"Term": the term of the interest index used in calculating the particular payment (e.g., 3-months, 6-months, etc.).

In the present embodiment of this invention, the Payment Frequency element has the following XML definition:

```
<!ELEMENT paymentFrequency (term )>
<!ATTLIST paymentFrequency convention (IMM | FRN | Eurodollar |
Normal ) 'Normal'
        endOfMonth (Yes | No ) #REQUIRED >
```

(5) Amortization Frequency

The "Amortization Frequency" element describes information relating to the frequency of a particular amortization to be performed. The Amortization Frequency element includes the following sub-elements and attributes:

"Convention": a particular calculation methodology based on the market convention (e.g., "IMM", "FRN", "Eurodollar", or "Normal").

"End of Month": indicator of whether the particular amortization should be moved to the end of the month.

"Term": the period of time for a single amortization calculation period (e.g., 3-months, 6-months, etc.).

In the present embodiment of this invention, the Payment Frequency element has the following XML definition:

```
<!ELEMENT paymentFrequency (term )>
<!ATTLIST paymentFrequency convention (IMM | FRN | Eurodollar |
Normal ) 'Normal'
        endOfMonth (Yes | No) #REQUIRED >
``` ii. Reference Data

Reference data describes the profile information specific to Members and Providers that will be referenced in any transactions engaged in by such parties. The FinXML syntax represents this profile information with the following elements: "Organization" element 710 (FIG. 4), "Contact Information" element 730 (FIG. 4), "Address" element 765 (FIG. 4), "Credit Rating" element 805 (FIG. 4), "Legal Entity" element 605 (FIG. 5), and "Book" element 625 (FIG. 5).

(a) Organization

Organization element 710 (as shown in FIG. 4) describes the organizational information regarding a Disclosed Party 705. Organization element 710 includes the following sub-elements and attributes:

"Organization Name" 715: the full name of the organization.

"Organization Short Name" 720: the short name of the organization.

"Address" 725: the address of the organization.

In the present embodiment of this invention, Organization element 710 has the following XML definition:

```
<!ELEMENT organization (organizationShortName, organizationName,
address )>
<!ELEMENT organizationShortName (#PCDATA )>
<!ELEMENT organizationName (#PCDATA )>
```

(b) Contact Information

Contact Information element 730 (as shown in FIG. 4) describes the information necessary to contact a Disclosed Party 705 during the transaction process. Contact Information element 730 includes the following sub-elements and attributes:

"Contact Name" 735: name of the specific contact within the party.

"Contact ID": the identifier of the particular contact.

"Telephone" 740: the telephone details of the party.

"Fax" 745: the fax details of the party.

"Telex" 750: the telex details of the party.

"Email" 755: the electronic mail details of the party.

"URL" 760: the Uniform Resource Locator details of the party.

In the present embodiment of this invention, Contact Information element 730 has the following XML definition:

```
<!ELEMENT contactInformation (contactName, (telephone | fax | telex |
email | url)* )>
<!ATTLIST contactInformation contactID #REQUIRED
        default (Y | N ) #REQUIRED >
<!ELEMENT contactName (#PCDATA )>
<!ELEMENT telex (#PCDATA )>
<!ELEMENT telephone (#PCDATA )>
<!ELEMENT fax (#PCDATA )>
```

-continued

```
<!ELEMENT email (#PCDATA )>
<!ELEMENT URL (#PCDATA )>
```

(c) Address

Address element 765 (as shown in FIG. 4) describes the registered address information of the Disclosed Party 705. Address element 765 includes the following sub-elements and attributes:

"Address1" 770: the first line of the street address of the party.

"Address2" 775: the second line of the street address of the party.

"City" 780: the city of the party.

"State-Province-County" 785: the state, province, and/or county of the party.

"Zip Postal Code" 790: the zip or postal code of the party.

"Country" 795: the country of the party.

"SWIFT Address" 800: the Bank-identifier Code ("BIC") of the party (as assigned by S.W.I.F.T. sc).

In the present embodiment of this invention, Address element 765 has the following XML definition:

```
<!ELEMENT address (address1, address2, city, stateProvinceCounty,
zipPostalCode, country, swiftAddress?)>
<!ELEMENT address1 (#PCDATA )>
<!ELEMENT address2 (#PCDATA )>
<!ELEMENT city (#PCDATA )>
<!ELEMENT stateProvinceCounty (#PCDATA )>
<!ELEMENT zipPostalCode (#PCDATA )>
<!ELEMENT country (#PCDATA )>
<!ELEMENT swiftAddress (#PCDATA )>
```

(d) Credit Rating

Credit Rating element 805 (as shown in FIG. 4) describes the details of the credit rating of the Disclosed Party 705 or Undisclosed Party 835, as rated by standard credit rating agencies. Credit Rating element 805 includes the following sub-elements and attributes:

"Agency" 810: the name of the credit rating agency that provided the credit rating of the party.

"Rating" 815: the actual rating value (e.g., AAA, BB, ed.) of the party provided by the credit rating agency.

"Country" 820: the country to which the party is assigned for purposes of the credit rating by the credit rating agency.

"Industry Group" 825: the industry group to which the party is assigned for purposes of the credit rating by the credit rating agency.

"Industry" 830: the industry to which the party is assigned for purposes of the credit rating by the credit rating agency.

In the present embodiment of this invention, Credit Rating element 805 has the following XML definition:

```
<!ELEMENT creditRating (agency, rating, country, industryGroup,
industry )>
<!ELEMENT agency (#PCDATA )>
<!ELEMENT rating (#PCDATA )>
<!ELEMENT name (#PCDATA )>
```

```
<!ELEMENT industryGroup (#PCDATA )>
<!ELEMENT industry (#PCDATA )>
```

(e) Legal Entity

Legal Entity element 605 (as shown in FIG. 5) describes the details of any legal entities (e.g., subsidiaries or affiliate companies) associate with an Internal Party 600 (as shown in FIG. 5). Legal Entity element 605 includes the following sub-elements and attributes:

"ID" 608: the identifier of the legal entity.

"Short Name" 610: the short name of the legal entity.

"Description" 615: the description of the legal entity.

"Parent" 620: the name of the parent organization of the legal entity.

In the present embodiment of this invention, Legal Entity element 605 has the following XML definition:

```
<!ELEMENT legalEntity (shortName, description, parent)>
<!ATTLIST legalEntity id ID #IMPLIED>
```

(f) Trading Book

Book element 625 (as shown in FIG. 5) describes the details of any internal trading book associated with the transaction by a party. Book element 625 includes the following sub-elements and attributes:

"ID": the identifier of the trading book.

"Type": the type of trading book.

"Short Name" 630: the short name of the trading book.

"Name" 635: the full name of the trading book.

"Description" 640: the description of the trading book.

"Reporting Currency" 645: the reporting currency of the trading book.

In the present embodiment of this invention, Book element 625 has the following XML definition:

```
<!ELEMENT book (shortName, name, description, reportingCurrency )>
<!ATTLIST book id ID #REQUIRED
         type CDATA #IMPLIED >
``` iii. Market Data

Market data describes information obtained from market sources for use in financial transactions. FinXML represents this information with the following elements: "Floating Interest Rate" element and "Interest Index" element.

(1) Floating Interest Rate

The "Floating Interest Rate" element describes information relating to the floating interest rate that can be used in a transaction. The Floating Interest Rate element includes the following sub-elements and attributes:

"ID": the identifier of the particular floating interest rate definition.

"Interest Index": the details of a particular index used for a floating interest rate, including currency ("Currency"), term ("Term"), and name ("Index Name").

"Spread": the differential (plus or minus) to be applied to the index rate in order to determine the floating interest rate.

In the present embodiment of this invention, the Floating Interest Rate element has the following XML definition:

```
<!ELEMENT floatingInterestRate (interestIndex, spread )>
<!ATTLIST floatingInterestRate id ID #IMPLIED >
```

(2) Interest Index

The "Interest Index" element describes information relating to the interest index used to calculate the floating interest rate. The Interest Index element includes the following sub-elements and attributes:

"ID": the identifier of the particular interest index.

"Currency": the currency of the interest index.

"Term": the term of the interest index (e.g., 3-months, 6-months, etc.).

"Index Name": the name of the interest index (e.g., "LIBOR").

In the present embodiment of this invention, the Interest Index element has the following XML definition:

```
<!ELEMENT interestIndex (currency, term, indexName )>
<!ATTLIST interestIndex id ID #IMPLIED >
<!ELEMENT indexName (#PCDATA)>
```

2. "Connect" Processor

In the present embodiment of this invention, the Connect Processor 20 (as shown in FIG. 1) provides the means for communicating information related to financial transactions between users (i.e., Members and Providers) and the CFOWeb System. Connect Processor 20 performs this function by converting FinXML (or other XML) documents to/from financial (Java) objects using proprietary stylesheets created in XSL, known as "FinScript", as will be described below.

In the present embodiment of this invention, both Connect Processor 20 and Connect Messaging Server 90 process messages between users and the CFOWeb System and convert FinXML (or other XML) documents to/from financial (Java) objects. Whereas Connect Processor 20 performs such conversion between FinXML (or other XML) documents and the proprietary objects of Members and Providers, Connect Messaging Server 90 performs such conversion between FinXML (or other XML) documents and the proprietary objects of the CFOWeb System. Connect Messaging Server 90 provides centralized (within the CFOWeb System) messaging and conversion functionality, while Connect Processor 20 provides distributed messaging and conversion functionality at Member and Provider client sites. Therefore, in the present embodiment of this invention, descriptions of the messaging and conversion functionality of Connect Processor 20 are also applicable to Connect Messaging Server 90.

a. Functional Overview

Figure 7:
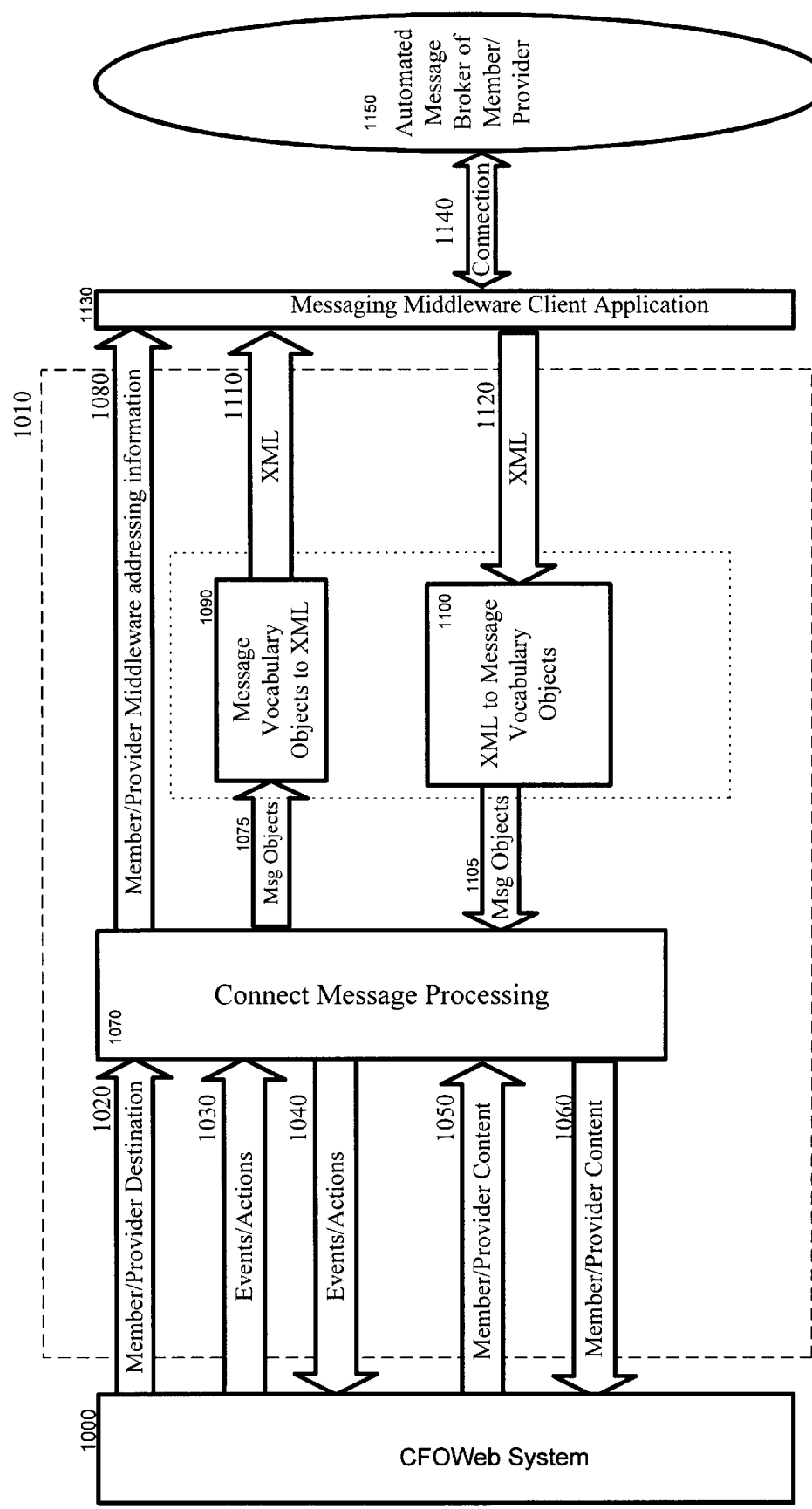
FIG. 7 shows the general architecture of the Connect Automated Processor in an embodiment of the present invention.

FIG. 7 illustrates an overview of the Connect Processor and its functionality. Connect Processor 1010 (including Connect Messaging Server) serves as an intermediary between the CFOWeb System 1000, including its various servers (as shown in FIG. 1), and the systems of Members and Providers. Connect Processor 1010 processes "messages" and "trades." Messages include communications between Members/Providers and the various servers of CFOWeb System 1010 (e.g., chat, e-mail, reports, portfolio management, etc.) that describe actions and events to be performed. Messages include trade information regarding financial transactions between Members and Providers. Note, however, that not all messages include information regarding specific financial transactions.

Members and Providers send requests for price quotes, price quotes, and other messages via an automated message broker 1150, which in turn sends such information through automated connection 1140 to a messaging middleware client application 1130 that is in communication with Connect Processor 1010. Messaging middleware client application 1130 sends the information, in the form of XML streams 1120 to Connect Processor 1010. Connect Processor 1010 converts 1100 the XML information into "Connect" message objects (including trade objects) 1105 (as will be described below). Connect Processor 1010 processes 1070 the message objects 1105 and, if related to trades, sends the message objects 1105 to the CFOWeb System 1000, including the content 1060 provided by the Member or Provider. Alternatively, if the message objects 1105 do not include information regarding specific financial transactions and relate to non-trade functions on CFOWeb System 1000, Connect Processor 1010 will send the message objects 1105 as actions or events to be performed at one of the system servers.

Connect Processor 1010 processes 1070 messages 1050 (which may include trade information) to Members or Providers by converting them into message objects 1075. In addition, Connect Processor 1010 processes actions and events 1030 occurring at any of the system servers by converting them into message objects 1075. Next, Connect Processor 1010 converts 1090 the message objects 1075 into XML documents 1110 (which may be in the form of FinXML documents). Connect Processor 1010 sends the resulting XML documents 1110 (e.g., a price quote or price quote request) to messaging middleware client application 1130. Messaging middleware client application 1130 sends the XML documents 1110 to the automated message broker 1150 of the appropriate Member or Provider through automated connection 1140, for conversion into objects. Note that in parallel to the processing and conversion of messages and objects from CFOWeb System 1000, Connect Processor 1010 routes the appropriate destination 1020 and addressing information 1080 for the particular Member or Provider that will receive the XML documents 1110. The XML documents (which may be in the form of FinXML documents) will be converted into objects appropriate for processing by the Member or Provider (as described below).

b. Architecture

Figure 8:
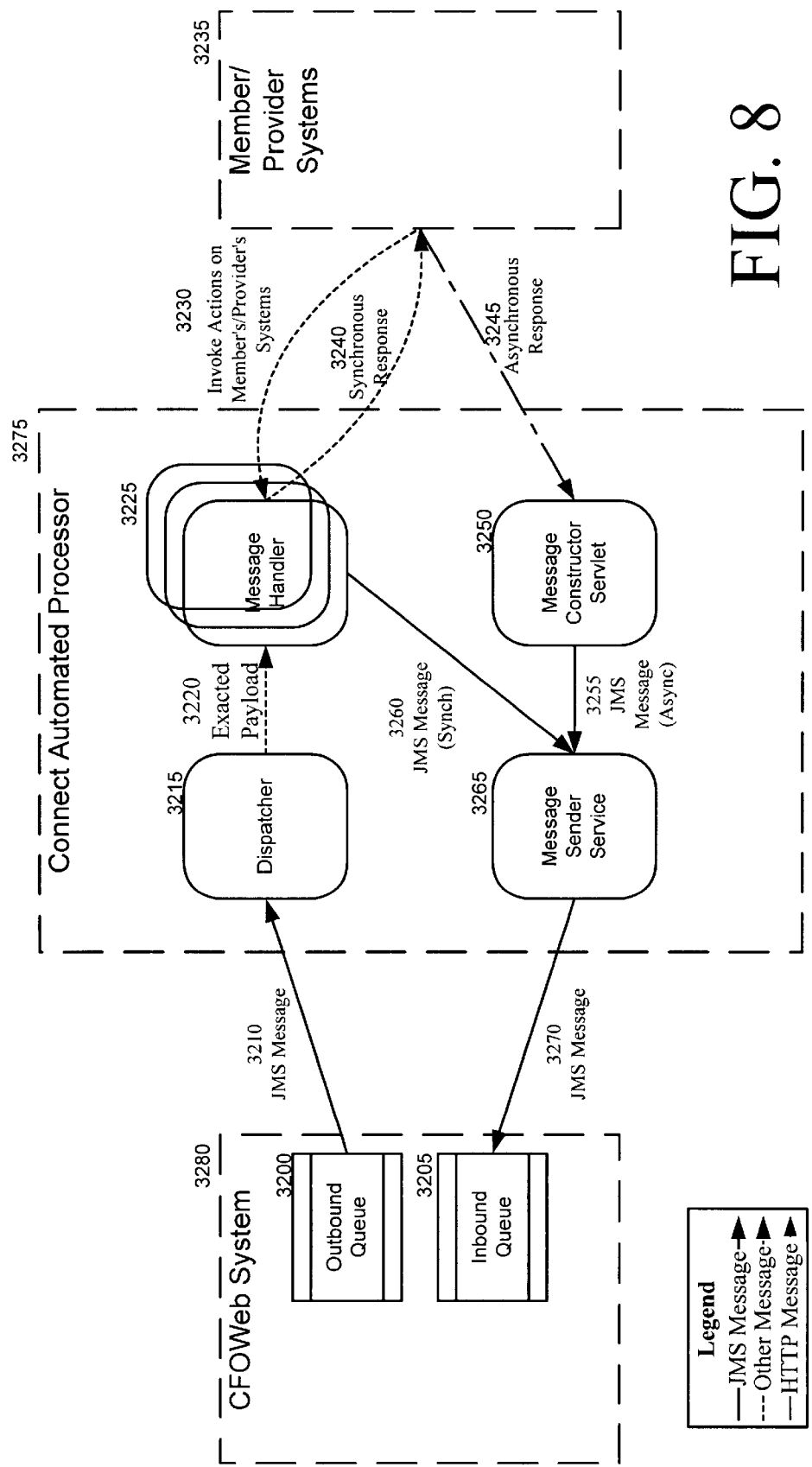
FIG. 8 shows an architectural overview of the Connect Automated Processor in an embodiment of the present invention.

FIG. 8 shows the architecture of the Connect Processor 3275 in an embodiment of this invention. CFOWeb System 3280 includes Outbound Queue 3200 and Inbound Queue 3205 for the storage of outgoing messages 3210 and incoming messages 3270, respectively. In this embodiment, messages 3210 and 3270 are in "Java Messaging Server" ("JMS") format. Connect Processor 3275 includes Dispatcher module 3215, which extracts the message "payload" 3220 from message 3210 and passes the payload 3220 as a Java object to the appropriate Message Handler 3225. Payload 3220 contains the information represented by the FinXML "Trade" element (described above and in FIG. 3), including information regarding the parties engaged in the transaction and the type of transaction.

Connect Processor 3275 contains one or more Message Handlers 3225; a different Message Handler 3225 can be constructed to handle each type of message to be received by the Member or Provider. Using payload 3220, the appropriate Message Handler 3225 will invoke actions 3230 on the target Member or Provider system 3235, where the action is based on the information contained in payload 3220. The Member/Provider system 3235 communicates with Message Handler 3225 by sending a synchronous response 3240. The Member/Provider system 3235 sends an asynchronous response 3245 to Message Constructor Servlet 3250. Message Constructor Servlet 3250 enables the Member/Provider system 3235 to asynchronously construct messages for the CFOWeb System 3280 by sending parameters via transfer protocol (e.g., HTTP/IP) calls. Message Constructor Servlet 3250 will send the asynchronous message 3255 to Message Sender Service 3265. Message Sender Service 3265 also receives synchronous messages 3260 from Message Handler 3225. Message Sender Service 3265, in turn, forwards the messages 3270 to Inbound Queue 3205 of CFOWeb System 3280.

c. Message Structure

Figure 9:
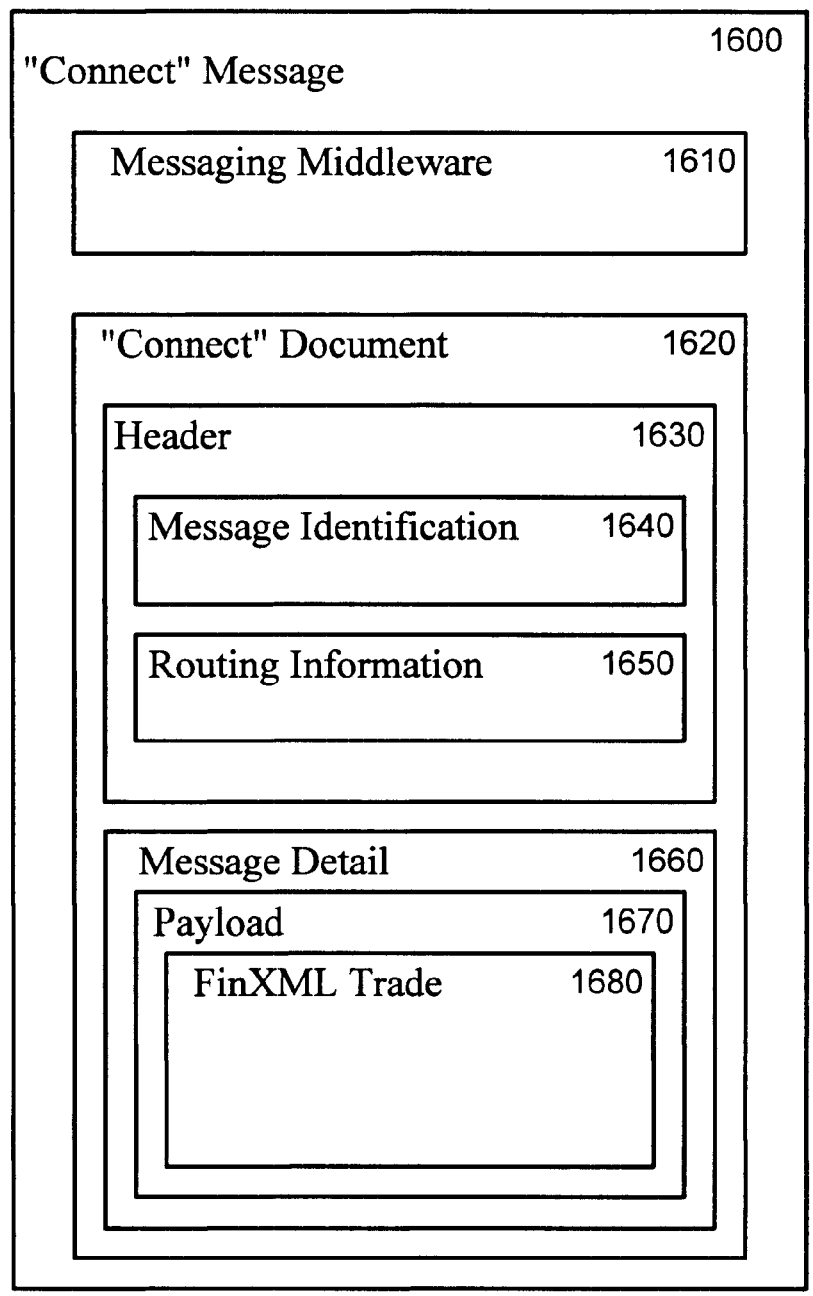
FIG. 9 shows the layout of a Connect Message in an embodiment of the present invention.

FIG. 9 shows the structure of the messages 1600 that are distributed by the Connect Processor between the CFOWeb System and systems of Members and Providers, in an embodiment of this invention. The system uses the messages to communicate all system events and transactions among system users. There are two categories of messages: "Workflow" messages and "Control" messages. Workflow messages are the main messages that describe the structure and value of transactions, deliver information to and from system servers for portfolio management, trading, and other functions, and deliver information between Members and Providers. Control messages communicate acknowledgement and exception information.

In this embodiment, each message 1600 is expressed in XML in Java Messaging Server" ("JMS") format. Each message 1600 consists of JMS-based middleware 1610 and document 1620. Middleware 1610, which may be an off-the-shelf product, includes communications protocol (e.g., HTTP/IP, SSL, TCP) and message administration and logging functionality that enable the reliable transmission of XML documents across networks and between the CFOWeb System and the Connect Processor.

Document 1620, which is an XML document, includes header 1630 and message detail 1660. Header 1630, in turn, includes message identification 1640 and routing information 1650. Message identification 1640 includes the message type (e.g., Workflow or Control), a message identifier, and a date/time stamp. Routing information 1650 identifies the message source and destination. Such information is managed by a routing table within the CFOWeb System that maps source and destination identifiers against participating Members and Providers.

Message detail 1660 includes text describing the purpose and detail of the message and may contain the payload 1670, which includes FinXML Trade information 1680 (represented by the FinXML "Trade" element described above and in FIG. 3) that defines the transaction.

i. XML Message Structure

Figure 10:
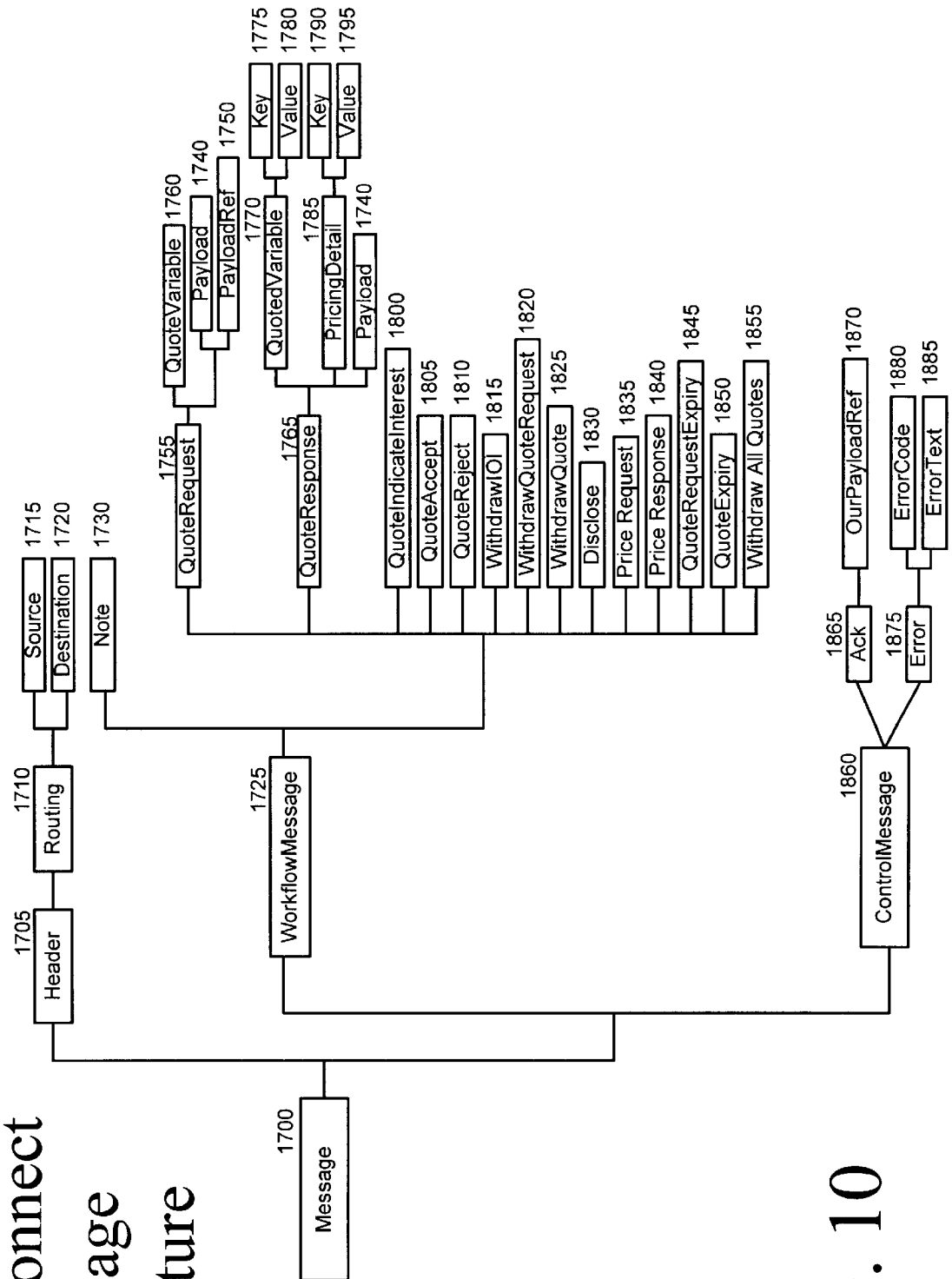
FIG. 10 shows the structure of a Connect Message in an embodiment of the present invention.

FIG. 10 illustrates the structure of a Connect message, as expressed in XML, in the present embodiment of this invention.

(a) Message Root Tag

Message root tag 1700 (or "CFOWeb Connect" root tag) identifies the message as a Connect message, and includes the following attributes:

"System Name": the name of the system that generated the message, e.g., "CFOWeb", "Connect" (for a Member or Provider system), or the name of a third-party system, if applicable.

"System ID": the identifier of the system that generated the message.

"Version": the version of the Connect message vocabulary; may differ for different Member/Provider configurations.

"Test": identifier of messages as "test" ("Y") or "live" ("N"); a test message in a live environment will be communicated but not included and acted on in the business workflow.

In the present embodiment of this invention, the Message root tag 1700 has the following XML definition:

```
<!ELEMENT Message (header, (workflowMsg | controlMsg ) )>
<!ATTLIST Message systemName CDATA #REQUIRED
    systemId CDATA #REQUIRED
    version CDATA #FIXED '1.0'
    test (Y | N ) #REQUIRED >
```

(b) Header

Header element 1705 describes message identification information, and includes the following attributes:

"Conversation ID": a system-assigned sequence number that identifies the message as belonging to a particular conversation initiated by one of the communicating parties.

"Sequence ID": sequence number generated separately by each communicating node that is used as a reference by control messages and to provide chronological ordering of messages.

"Sent Time": a system-assigned timestamp which indicates the time that the XML document was formed.

In the present embodiment of this invention, the Header element 1705 has the following XML definition:

```
<!ELEMENT header (routing )>
<!ATTLIST header conversationId CDATA #REQUIRED
    sequenceId CDATA #REQUIRED
    sentTime CDATA #REQUIRED >
```

(c) Routing Information

Routing element 1710 contains reference routing information about the source and destination of the message. This information includes the system-defined identifier of Members and Providers. The routing information is used to derive the middleware-addressing scheme (e.g., point-to-point message queue, topic of a publish/subscribe channel) and to identify the user responsible for the conversation. Routing element 1710 includes the following sub-elements:

"Source" 1715: the identifier of the source organization; this is a reference to a Counterparty element; can be anonymous.

"Destination" 1720: the identifier of the destination organization; this is a reference to a Counterparty element; can be anonymous.

In the present embodiment of this invention, the Routing element 1710 has the following XML definition:

```
<!ELEMENT routing (source , destination )>
<!ELEMENT source (#PCDATA )>
<!ELEMENT destination (#PCDATA )>
```

(d) Workflow Messages Workflow Message element 1725 contains descriptions of messages that effect state transition and actions in the workflow cycle, including financial transactions, communications between Members and Providers, and interactions with CFOWeb System servers. Workflow Message element 1725 contains "Note" element 1730, which is used as an indicator whenever a Member or Provider desires to attach freeform, textual information with trade information. In addition, each instance of Workflow Message element 1725 contains one of the following Workflow Message types:

(1) Quote Request
(2) Quote Response
(3) Quote Indicate Interest
(4) Quote Accept
(5) Quote Reject
(6) Withdraw Indication of Interest ("IOI")
(7) Withdraw Quote Request
(8) Withdraw Quote
(9) Withdraw All Quotes
(10) Disclose
(11) Price Request
(12) Price Response
(13) Quote Request Expiry
(14) Quote Expiry Each Workflow Message type element represents a different type of Workflow Message, which will be described below.

In the present embodiment of this invention, Workflow Message element 1725 has the following XML definition:

```
<!ELEMENT workflowMsg (none).
(quoteRequest | quoteResponse | quoteIndicateInterest | quoteAccept |
quoteReject | withdrawIOI | withdrawQuoteRequest | withdrawQuote |
withdrawAllQuotes | disclose | priceRequest | priceResponse |
quoteRequestExpiry | quoteExpiry ) )>
```

(1) Quote Request Message

Quote Request Message element 1755 describes a message to notify a Provider's system that a Member is requesting a price quote. Quote Request Message element 1755 includes the FinXML trade object as its payload, as well as information regarding the type of quote requested by the Member (e.g., spread). The CFOWeb System may handle an incoming Quote Request Message element 1755 in the following ways: (i) use Provider-configured automated pricing and send a "Quote Response Message" containing a computed price; or (ii) pass the Quote Request information to an internal trading environment to alert a Provider that the quote is available to be filled, in which case the trade details from the payload could be loaded into a back-end spreadsheet or other pricing system to allow a Provider to price the trade manually.

Quote Request Message element 1755 includes the following sub-elements and attributes:

"Quote Variable" 1760: the variable(s) necessary to express a quote.

"Request ID": identifier of the Quote Request.

"Expiry Time": deadline (in 24-hour format) specified by Member for submission of quotes in response to Quote Request.

"Leg Ref": identifier of particular trade leg for which quote requested, if applicable ("Leg ID" of particular leg or "None").

"Payload Ref" 1750: identifier of particular financial transaction.

"Payload" 1740: information describing a particular financial transaction.

"Payload Type": the category of payload (e.g., FinXML).

In the present embodiment of this invention, Quote Request Message element 1755 has the following XML definition:

```
<!ENTITY % payloadDef "payload
    | payloadType">
<!ELEMENT quoteRequest (quoteVariable+, (%payloadDef; ) )>
<!ATTLIST quoteRequest requestId CDATA #REQUIRED
    expiryTime CDATA #REQUIRED >
```

The following is an example Quote Request Message element 1755 in the present embodiment of this invention:

```
<?xml version="1.0"?>
<!DOCTYPE cfo WebConnect SYSTEM "CFOWEBConnect.dtd">
<cfoWebConnect systemName="CFOWeb Connect" systemId="cfoweb"
version="1.0" test="N">
    <header conversationId="000001" sequenceId="000002" sentTime=
    "1999-12-13T19:39:34">
        <routing>
            <source>ABC Corp.</source>
            <destination>XYZ</destination>
        </routing>
    </header>
    <workflowMsg>
        <note>This is a quote request</note>
        <quoteRequest requestId="1234" expiryTime=
        "1999-12-13T19:40:34">
            <quoteVariable legRef="none">
                <key>fxRate</key>
            </quoteVariable>
            <payloadType="FinXML"/>
        </quoteRequest>
    </workflowMsg>
</cfoWebConnect>
```

(2) Quote Response Message

Quote Response Message element 1765 describes a message to notify the CFOWeb System that a Provider has submitted a price quote in response to a Quote Request Message from a Member. Quote Response Message element 1765 includes the value of the quoted variables and can optionally include a payload of the complete trade, which is useful where the Provider may have suggested a modified or alternate structure. The CFOWeb System uses the payload information to update the original quote request with a price quote and refreshes the requesting Member's web browser to display the offered price quote.

Quote Response Message element 1765 includes the following sub-elements and attributes:

"Quoted Variable" 1770: the quoted variable(s) used to express a quote.

"Key" 1775: name of the quoted variable.

"Value" 1780: the value of the price quote.

"Pricing Detail" 1785: additional information regarding the price quote (e, price sensitivity).

"Key" 1790: name of the pricing detail.

"Value" 1795: the value of the pricing detail.

"Request ID": identifier of the Quote Request for which Quote Response is submitted.

"Quote ID": identifier of the Quote Response.

"Expiry Time": deadline (in 24-hour format) specified by Provider for validity of price quote.

"Leg Ref": identifier of particular trade leg for which price quote submitted, if applicable (e.g., "Leg ID" of particular leg or "None").

"Payload" 1740: information describing a particular financial transaction.

"Payload Type": the category of payload (e.g., FinXML).

In the present embodiment of this invention, Quote Response Message element 1765 has the following XML definition:

```
<!ELEMENT quotedVariable (%keyValuePair; )>
<!ATTLIST quotedVariable legRef CDATA #REQUIRED >
<!ELEMENT pricingDetail (%keyValuePair; )>
<!ATTLIST pricingDetail legRef CDATA #REQUIRED >
<!ENTITY % requestQuoteRef "requestId CDATA #REQUIRED
        quoteId CDATA #REQUIRED">
<!ELEMENT quoteResponse (quotedVariable+ , pricingDetail*,
payload? )>
<!ATTLIST quoteResponse %requestQuoteRef;
        expiryTime CDATA #REQUIRED >
```

The following is an example Quote Response Message element 1765 in the present embodiment of this invention:

```
<?xml version="1.0"?>
<!DOCTYPE cfoWebConnect SYSTEM "CFOWEBConnect.dtd">
<cfoWebConnect systemName="CFOWeb Connect" systemId=
"connect" version="1.0" test="N">
    <header conversationId="000001" sequenceId=
    "000005" sentTime="1999-12-13T19:39:52">
        <routing>
            <source>XYZ</source>
            <destination>ABC Corp.</destination>
        </routing>
    </header>
    <workflowMsg>
        <note>This is a quoteResponse</note>
        <quoteResponse requestId="1234" quoteId=
        "1" expiryTime="1999-12-13T19:40:22">
            <quotedVariable legRef="none">
                <key>fxRate</key>
                <value>102</value>
            </quotedVariable>
            <pricingDetail legRef="none">
                <key>market data</key>
                <value>Reuters at 1999-12-13T19:41:09</value>
            </pricingDetail>
        </quoteResponse>
    </workflowMsg>
</cfoWebConnect>
```

(3) Other Workflow Messages

In the present and other embodiments of this invention, Workflow Message element 1725 can include other message types to enable communications related to financial transactions.

(i) Quote Indicate Interest Message

Quote Indicate Interest Message element 1800 describes a message used by the CFOWeb System 3280 (in FIG. 8) to notify the Connect Processor 3275 that a Member has indicated interest in a price quote submitted by a Provider in response to the Member's earlier quote request. The Connect Processor 3275 can be configured with a Message Handler 3225 that will route Quote Indicate interest Message element 1800 to the provider's internal system 3235 as a screen pop-up or alert.

(ii) Quote Accept Message

Quote Accept Message element 1805 describes a message used by the CFOWeb System to notify the Connect Processor that a Member wishes to accept the price quote submitted by a Provider. Quote Accept Message element 1805 includes a reference to the quote request and the price accepted by the Member. The system will send the Quote Accept Message only to the Provider whose price was accepted; all other Providers who submitted price quotes in response to the quote request will receive a "Quote Reject Message" (described below). The Connect Processor 3275 (in FIG. 8) can be configured with a Message Handler 3225 that will route Quote Accept Message element 1805 to the Provider's internal system 3235 as a screen pop-up or alert.

(iii) Quote Reject Message

Quote Reject Message element 1810 describes a message used by the CFOWeb System to notify a Provider that a Member has rejected the price quote submitted by the Provider. This will occur when a Member expressly rejects a Provider's price quote, or accepts another Provider's quote in response to the same quote request, thus implicitly rejecting all other price quotes. Quote Reject Message element 1810 includes a reference to the quote request. The Connect Processor 3275 (in FIG. 8) can be configured with a Message Handler 3225 that will route Quote Reject Message element 1810 to the Provider's internal system 3235 as a screen pop-up or alert.

(iv) Withdraw Indication of Interest Message

Withdraw Indication of Interest ("IOI") Message element 1815 describes a message used by the CFOWeb System 3280 (in FIG. 8) to notify the Connect Processor 3275 that a Member has withdrawn its indication of interest in a price quote submitted by a Provider in response to the Member's earlier quote request. The Connect Processor 3275 can be configured with a Message Handler 3225 that will route Withdraw IOI Message element 1815 to the Provider's internal system 3235 as a screen pop-up or alert.

(v) Withdraw Quote Request Message

Withdraw Quote Request Message element 1820 describes a message used by the CFOWeb System to notify the Connect Processor that a Member wishes to withdraw a quote request that was sent previously. All Providers that were sent the original Quote Request Message will receive the Withdraw Quote Request Message as they no longer need to track activity on their price quotes regarding the particular quote request. its indication of interest in a price quote submitted by a Provider in response to the Member's earlier quote request. The Connect Processor 3275 (in FIG. 8) can be configured with a Message Handler 3225 that will route Withdraw Quote Request Message element 1820 to the Provider's internal system 3235 as a screen pop-up or alert.

(vi) Withdraw Quote Message

Withdraw Quote Message element 1825 describes a message used by the CFOWeb System to indicate that a Provider wishes to withdraw a price quote that was sent previously. The Withdraw Quote Message can be sent from either the CFOWeb System if a Provider withdraws the price quote manually or through the Connect Processor if the withdrawal action is generated by means of a Provider's internal system (either manually or automatically). If the Withdraw Quote Message is generated through the Connect Processor, a synchronized clock timestamp will be set on the message indicating the expiration time of the price quote.

(vii) Disclose Message

Disclose Message element 1830 describes a message used by the CFOWeb System to disclose to a party the identity of a previously undisclosed Counterparty. Such disclosure will only occur upon notification of the system by the Counterparty to disclose its identity.

(viii) Price Request Message

Price Request Message element 1835 describes a message used by the CFOWeb System for semi-automated pricing to notify the Connect Processor that a Member is requesting a price quote for request from the Member's internal system. Price Request Message element 1835 includes the FinXML trade object as its payload, as well as information regarding the type of quote requested by the Member (e.g., spread). The Connect Processor handles the message with one or more Providers and sends the CFOWeb System a "Price Response Message" (described below) containing a price quote.

(ix) Price Response Message

Price Response Message element 1840 describes a message used by the Connect Processor for semi-automated pricing to notify the CFOWeb System that a Provider's internal system has calculated a price quote for a quote request and to submitted the price quote to the CFOWeb System. The CFOWeb System uses the information to refresh the requesting Member's web browser to display the offered price quote. The Provider may submit the quote with this pricing information or with information entered manually. In either case, the Provider submits the price quote to the Member manually (e.g., by clicking a button).

(x) Quote Request Expiry Message

Quote Request Expiry Message element 1845 describes a message used by the CFOWeb System to notify the Connect Processor that a Member's quote request has expired. The CFOWeb System generates the Quote Request Expiry Message automatically upon the occurrence of the expiry time for the quote request. All Providers that were sent the original Quote Request Message will receive the Quote Request Expiry Message as they no longer need to track activity on their price quotes regarding the particular quote request. The Connect Processor 3275 (in FIG. 8) can be configured with a Message Handler 3225 that will route Quote Request Expiry Message element 1845 to the Provider's internal system 3235 as a screen pop-up or alert.

(xi) Quote Expiry Message

Quote Expiry Message element 1850 describes a message used by the CFOWeb System to notify the Connect Processor that a Provider's price quote has expired. The CFOWeb System generates the Quote Expiry Message automatically upon the occurrence of the expiry time for the price quote.

(xii) Withdraw All Quotes Message

Withdraw All Quotes Message element 1855 describes a message used by the CFOWeb System to notify the Connect Processor that a Provider wishes to withdraw all price quotes. The message can specify criteria for the quotes to be withdrawn.

(e) Control Messages

Control Message element 1860 contains descriptions of messages that are sent in response to Workflow Messages to indicate the success or failure of message receipt and processing. While the middleware serves to transmit messages between the CFOWeb System and the Connect Processor, the middleware does not guarantee certain system performance parameters, including particular delivery time, successful translation and processing of the XML content, or the successful provision of a price quote. Thus, Control Message element 1860 provides acknowledgement of message delivery and reports error conditions to the sender of a message.

Control Message element 1860 includes a "Sequence ID" element, which is a system-assigned sequence number for the particular Workflow Message to which Control Message element 1860 applies. In addition, each instance of Control Message element 1860 contains one of the following Control Message types:

(1) Ack (2) Error Each Control Message type element represents a different type of Control Message, which will be described below.

In the present embodiment of this invention, Control Message element 1860 has the following XML definition:

```
<!ELEMENT controlMessage ack | error)>
<!ATTLIST controlMessage sequenceId CDATA #REQUIRED >
```

(1) Acknowledge Message

Acknowledge ("Ack") Message element 1865 is used to acknowledge the successful receipt, translation, and processing of a Connect message and transaction payload. Ack Message element 1865 includes "Our Payload Ref" element 1870, which contains a reference to a Payload element 1740 (carried by the acknowledged message. Our Payload Ref element 1870 includes the following sub-elements:

"Payload Type": the category of payload (e.g., FinXML).

"Payload ID": the identifier of a previously communicated payload.

In the present embodiment of this invention, Ack Message element 1865, including Our Payload Ref element 1870, has the following XML definition:

```
<!ENTITY % payloadRef "payloadType CDATA #REQUIRED
        payloadId CDATA #REQUIRED">
<!ELEMENT ourPayloadRef EMPTY>
<!ATTLIST ourPayloadRef %payloadRef;>
<!ELEMENT ack (ourPayloadRef? )>
```

The following is an example Ack Message element 1865 in the present embodiment of this invention:

```
<?xml version="1.0"?>
<!DOCTYPE cfo WebConnect SYSTEM "CFOWEBConnect.dtd">
<cfoWebConnect systemName="CFOWeb Connect" systemId=
"connect" version="1.0" test="N">
    <header conversationId="000001" sequenceId="000003"
    sentTime="1999-12-13T19:39:52">
        <routing>
            <source>ABC Corp.</source>
            <destination>XYZ</destination>
        </routing>
    </header>
    <controlMsg sequenceId="000001">
        <ack/>
    </controlMsg>
</cfoWebConnect>
```

In the present and other embodiments of this invention, Ack Message element 1865 may include specific acknowledgement messages for verification and completion of a transaction, as described below.

(i) Trade Download Response Message

Trade Download Response Message element describes a message used by the CFOWeb System to notify a Provider's internal system that both the Provider and a Member have agreed to the terms of a particular price quote and that the specified trade should now be processed. The Connect Processor uses the Trade Download Response Message element to send all relevant trade information to the Provider's internal system for processing. The Trade Download Response Message element includes the trade payload.

(ii) Trade Download Acknowledge Message

Trade Download Acknowledge Message element describes a message used by the CFOWeb System to notify the Connect Processor that all necessary internal systems of the Provider have completed initial processing for a particular trade.

(iii) Trade Download Request Message

Trade Download Request Message element describes a message used by the Connect Processor when it needs to download executed trades from the CFOWeb System. Typically, this occurs when trades did not load properly. The CFOWeb System uses the Trade Download Request Message to send all trades to the Connect Processor so that it may process and feed the trade information to Providers' internal systems.

(iv) Deal Verify Request Message

Deal Verify Request Message element describes a message used by the Connect Processor to notify the CFOWeb System that a completed transaction has been verified at the Provider internal system and to request that the CFOWeb System also verify the completed transaction.

(v) Deal Verify Acknowledge Message

Deal Verify Acknowledge Message element describes a message used by the Connect Processor to communicate confirmation to the CFOWeb System that a Deal Verify Request Message has been received.

(vi) Deal Verify Confirm Message

Deal Verify Confirm Message element describes a message used by the CFOWeb System to communicate confirmation to the Connect Processor that a verification request has been carried out successfully.

(2) Error Message

Error Message element 1875 is used to provide notification to the sender of a message any time application-level processing of the XML message content fails, including the unsuccessful translation of XML into objects or execution of a pricing algorithm. Error Message element 1875 includes the following sub-elements:

"Error Code" 1880: the identifier of the particular type of error.

"Error Text" 1885: the text description of the particular type of error.

In the present embodiment of this invention, Error Message element 1875, has the following XML definition:

```
<!ELEMENT error (errorText?, errorCode )>
<!ELEMENT errorText (#PCDATA )>
<!ELEMENT errorCode (#PCDATA )>
```

The following is an example Error Message element 1875 in the present embodiment of this invention:

```
<?xml version="1.0"?>
<!DOCTYPE cfoWebConnect SYSTEM "CFOWEBConnect.dtd">
<cfoWebConnect systemName="CFOWeb Connect" systemId="connect" version="1.0" test="N">
    <header>
        <routing>
            <source>ABC Corp.</source>
            <destination>XYZ</destination>
        </routing>
        <message payloadType="FinXML" payloadId="123456"
            sequenceId="000005"
         sentTime="1999-12-13T19:39:22">
            <error sequenceId="000001">
                <errorText>Failed to instantiate trade in
                    Connect Cache</errorText>
                <errorCode>001</errorCode>
            </error>
        </message>
    </header>
    <body>
        <note>This is an error control message</note>
    </body>
</cfoWebConnect>
``` d. Message Flow

The flow of Workflow Messages back and forth from the CFOWeb System through the Connect Processor to Member and Provider internal systems differs depending on the type of Workflow Message (e.g., quote request, price quote) and the type of processing (e.g., automated, manual, synchronous, asynchronous).

i. Automated Pricing—Synchronous

Figure 11:
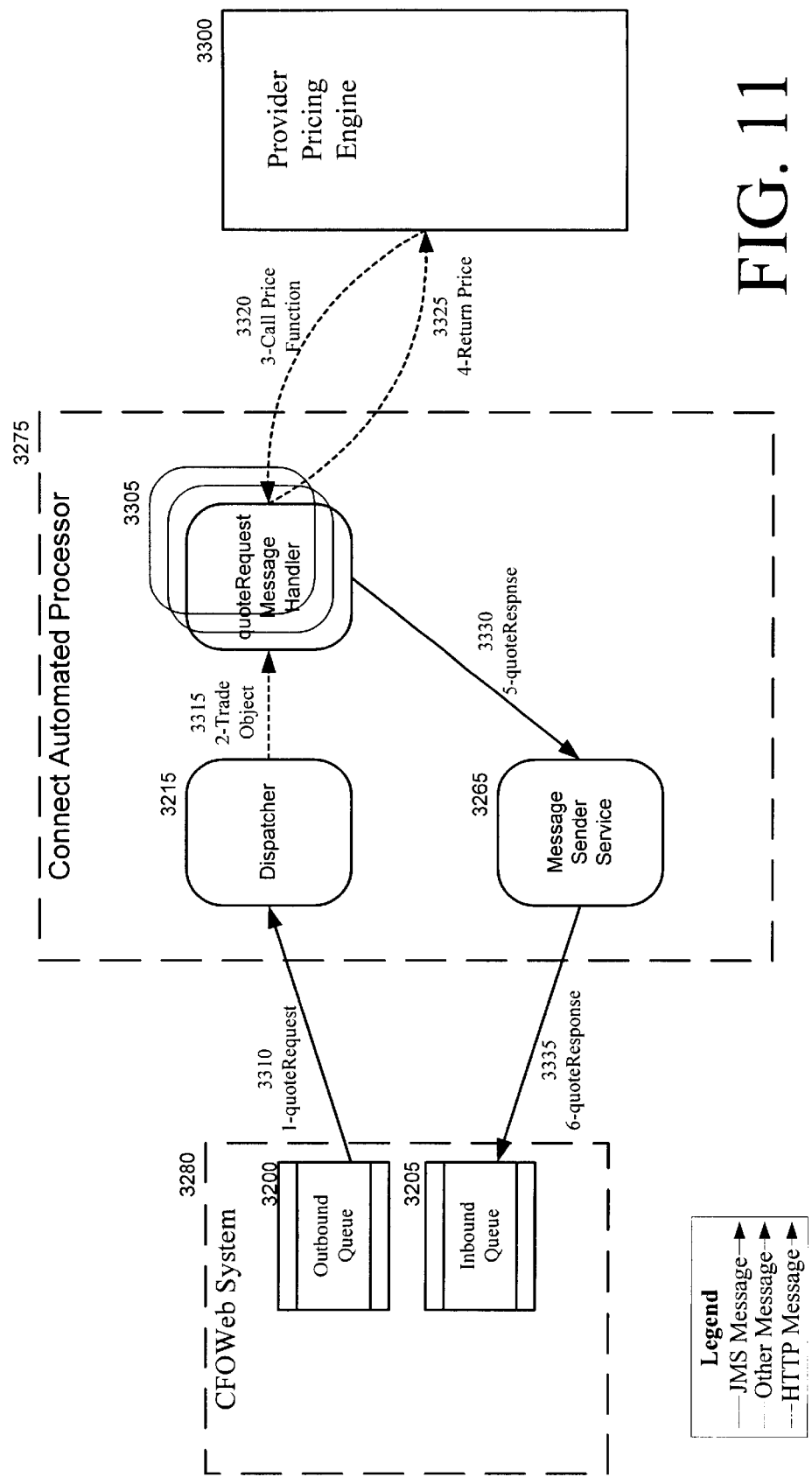
FIG. 11 shows a diagram of the Connect Message Flow for the automated pricing (synchronous) function in an embodiment of the present invention.

FIG. 11 illustrates the flow of Workflow Messages when synchronous automated pricing occurs. CFOWeb System 3280 sends Quote Request Message 3310 from Outbound Queue 3200 to Dispatcher module 3215 in Connect Processor 3275. Dispatcher 3215 extracts the payload from Quote Request Message 3310 and passes the payload as a Trade Object (Java object) 3315 to the Quote Request Message Handler 3305. Using the payload in Trade Object 3315, Quote Request Message Handler 3305 executes a "Call Price Function" 3320 on the target Provider pricing engine 3300 in the Provider's internal system. Call Price Function 3320 notifies the Provider's pricing engine 3300 to calculate and send a price quote, based on the information contained in Trade Object 3315. The Provider's pricing engine 3300 sends a synchronous response back to Quote Request Message Handler 3305 in the form of a "Return Price" Message 3325. Quote Request Message Handler 3305 generates a Quote Response Message 3330 using the price quote and sends it to Message Sender Service 3265. Message Sender Service 3265, in turn, forwards the Quote Response Message 3335 to Inbound Queue 3205 of CFOWeb System 3280 for processing.

ii. Automated Pricing—Asynchronous

Figure 12:
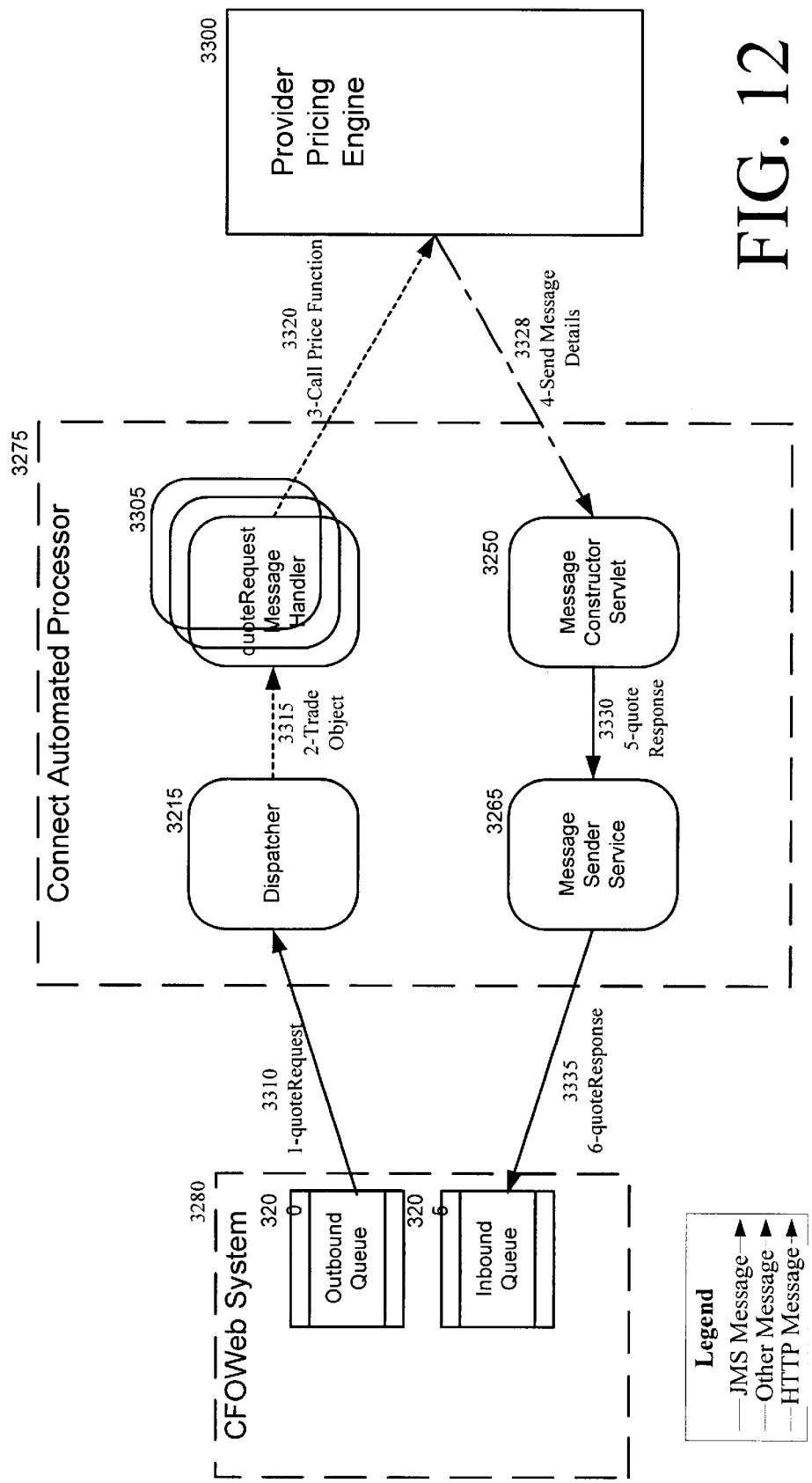
FIG. 12 shows a diagram of the Connect Message Flow for the automated pricing (asynchronous) function in an embodiment of the present invention.

FIG. 12 illustrates the flow of Workflow Messages when asynchronous automated pricing occurs. CFOWeb System 3280 sends Quote Request Message 3310 from Outbound Queue 3200 to Dispatcher module 3215 in Connect Processor 3275. Dispatcher 3215 extracts the payload from Quote Request Message 3310 and passes the payload as a Trade Object (Java object) 3315 to the Quote Request Message Handler 3305. Using the payload in Trade Object 3315, Quote Request Message Handler 3305 executes a "Call Price Function" 3320 on the target Provider pricing engine 3300 in the Provider's internal system. Call Price Function 3320 notifies the Provider's pricing engine 3300 to calculate and send a price quote, based on the information contained in Trade Object 3315. The Provider's pricing engine 3300 sends an asynchronous response that contains message details 3328 (i.e., price quote) to Message Constructor Servlet 3250. Message Constructor Servlet 3250 constructs a Quote Response Message 3330 using the price quote and sends it to Message Sender Service 3265. Message Sender Service 3265, in turn, forwards the Quote Response Message 3335 to Inbound Queue 3205 of CFOWeb System 3280 for processing.

iii. Semi-Automated Pricing—Synchronous

Figure 13:
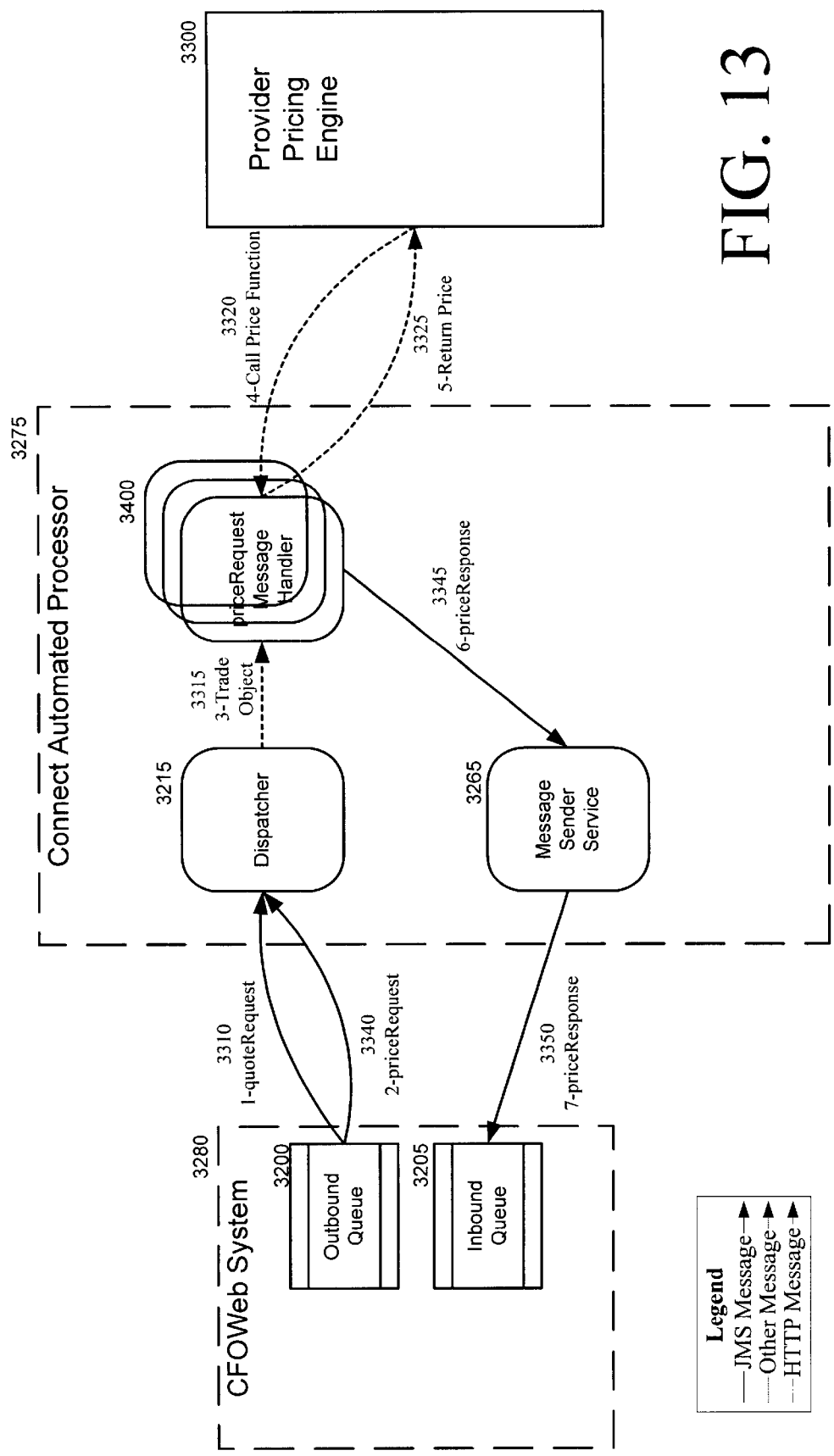
FIG. 13 shows a diagram of the Connect Message Flow for the semi-automated pricing (synchronous) function in an embodiment of the present invention.

FIG. 13 illustrates the flow of Workflow Messages when synchronous semi-automated pricing occurs. CFOWeb System 3280 sends Quote Request Message 3310 and Price Request Message 3340 from Outbound Queue 3200 to Dispatcher module 3215 in Connect Processor 3275. Price Request Message 3340 is a message used by the CFOWeb System 3280 for semi-automated pricing to notify the Connect Processor 3275 that a Member is requesting a price quote of a request from the Member's internal system. Dispatcher 3215 extracts the payload from Quote Request Message 3310 and passes the payload as a Trade Object (Java object) 3315 to the Price Request Message Handler 3400. Using the payload in Trade Object 3315, Price Request Message Handler 3400 executes a "Call Price Function" 3320 on the target Provider pricing engine 3300 in the Provider's internal system. Call Price Function 3320 notifies the Provider's pricing engine 3300 to calculate and send a price quote, based on the information contained in Trade Object 3315.

The Provider's pricing engine 3300 sends a synchronous response back to Price Request Message Handler 3400 in the form of a "Return Price" Message 3325. Price Request Message Handler 3400 generates a Price Response Message 3345 using the price quote and sends it to Message Sender Service 3265. Price Response Message 3345 is a message used by the Connect Processor 3275 for semi-automated pricing to notify the CFOWeb System 3280 that a Provider's internal system has calculated a price quote for a quote request and to submitted the price quote to the CFOWeb System 3280; the CFOWeb System 3280 uses the information to refresh the requesting Member's web browser to display the offered price quote. Message Sender Service 3265, in turn, forwards the Price Response Message 3350 to Inbound Queue 3205 of CFOWeb System 3280 for processing.

iv. Deal Transmission—Asynchronous

Figure 14:
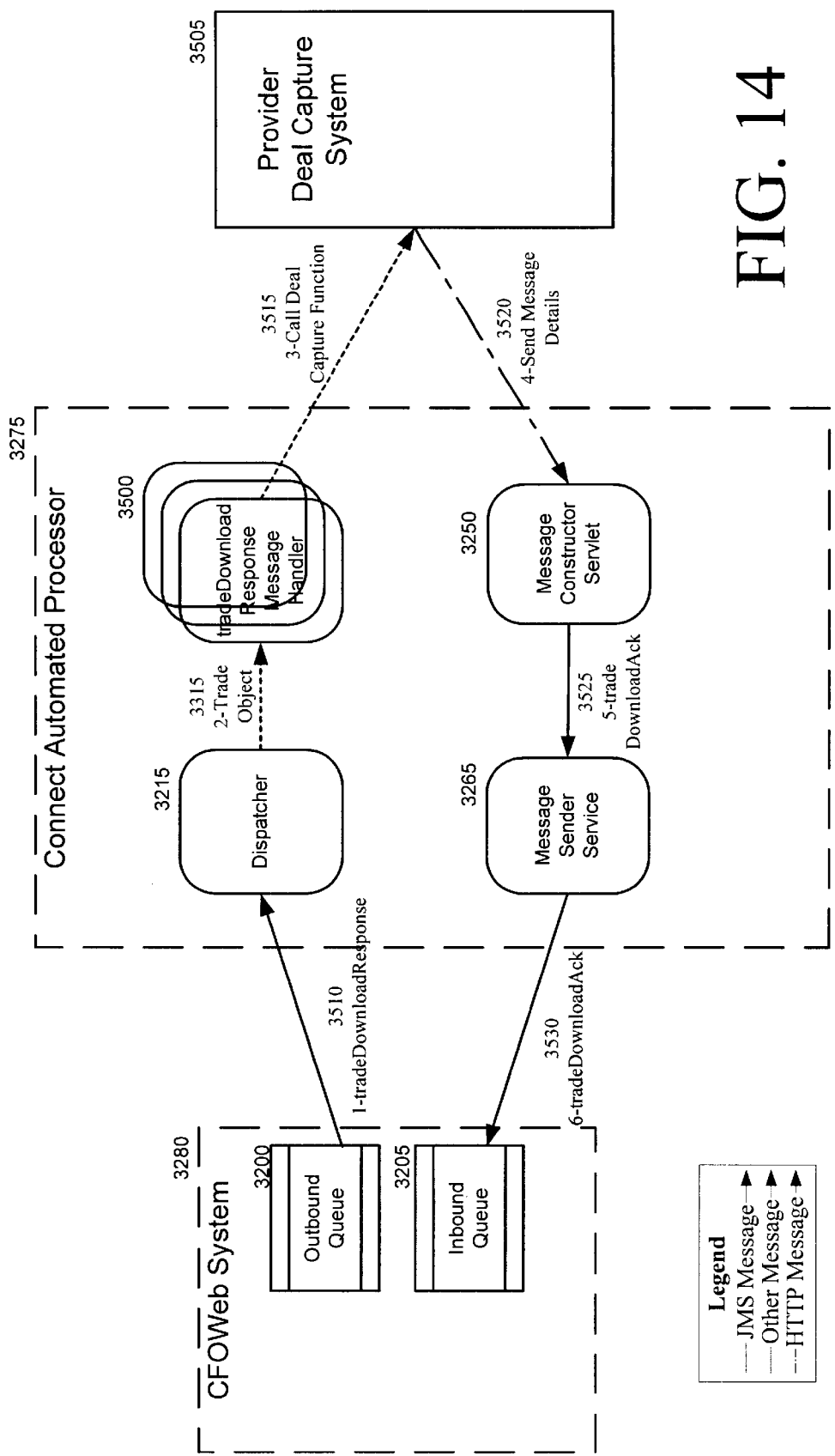
FIG. 14 shows a diagram of the Connect Message Flow for the deal transmission (asynchronous) function in an embodiment of the present invention.

FIG. 14 illustrates the flow of Workflow Messages when asynchronous transmission of a completed transaction occurs. CFOWeb System 3280 sends Trade Download Response Message 3510 from Outbound Queue 3200 to Dispatcher module 3215 in Connect Processor 3275. Trade Download Response Message is a message used by the CFOWeb System 3280 to notify a Provider's internal system that both the Provider and a Member have agreed to the terms of a particular price quote and that the specified trade should now be processed. The Connect Processor uses the Trade Download Response Message to send all relevant trade information to the Provider's internal system (i.e., deal capture system 3505) for processing.

Dispatcher 3215 extracts the payload from Trade Download Response Message 3510 and passes the payload as a Trade Object (Java object) 3315 to the Trade Download Response Message Handler 3500. Using the payload in Trade Object 3315, Trade Download Response Message Handler 3500 executes a "Call Deal Capture Function" 3515 on the target Provider deal capture system 3505 in the Provider's internal system. Call Deal Capture Function 3515 notifies the Provider's deal Capture system 3505 to process the confided transaction, based on the information contained in Trade Object 3315. The Provider's deal capture system 3505 sends an asynchronous response containing message details 3520 to Message Constructor Servlet 3250. Message Constructor Servlet 3250 constructs a Trade Download Acknowledge ("Ack") Message 3525 using message details 3520 and sends it to Message Sender Service 3265. Trade Download Ack Message is a message used by the Connect Processor 3275 to notify the CFOWeb System 3280 that all necessary internal systems of the Provider have completed initial processing for a particular trade. Message Sender Service 3265, in turn, forwards the Trade Download Ack Message 3530 to Inbound Queue 3205 of CFOWeb System 3280 for processing.

3. "FinScript"

The present invention enables users (Members and Providers) to conduct financial transactions using the CFOWeb System and Connect Processor via connections to the users' internal, back-end systems. In the present embodiment of this invention, the Connect Processor enables the communication of information related to financial transactions between users (i.e., Members and Providers) and the CFOWeb System by converting FinXML (or other XML) documents to/from proprietary financial (Java) objects—as used on the users' internal systems—using proprietary stylesheets created in XSL, known as "FinScript". The Connect Processor 20 (as shown in FIG. 1) creates a FinXML document that can be sent using a transfer protocol (e.g., HTTP/IP) to the Connect Messaging Server 90 for conversion to objects that can be processed on the server side. Following processing, the Connect Messaging Server 90 converts the objects to a FinXML (or other XML) document, using XSL stylesheets, and sends the FinXML (or other XML) document to the Connect Processor 20, which uses FinScript to create a JavaScript program from the FinXML (or other XML) document. In turn, Java objects are created from the JavaScript program and sent to the other organization (e.g., a Provider).

a. Conversion (Encoding) of Financial Objects to FinXML Documents

Figure 15:
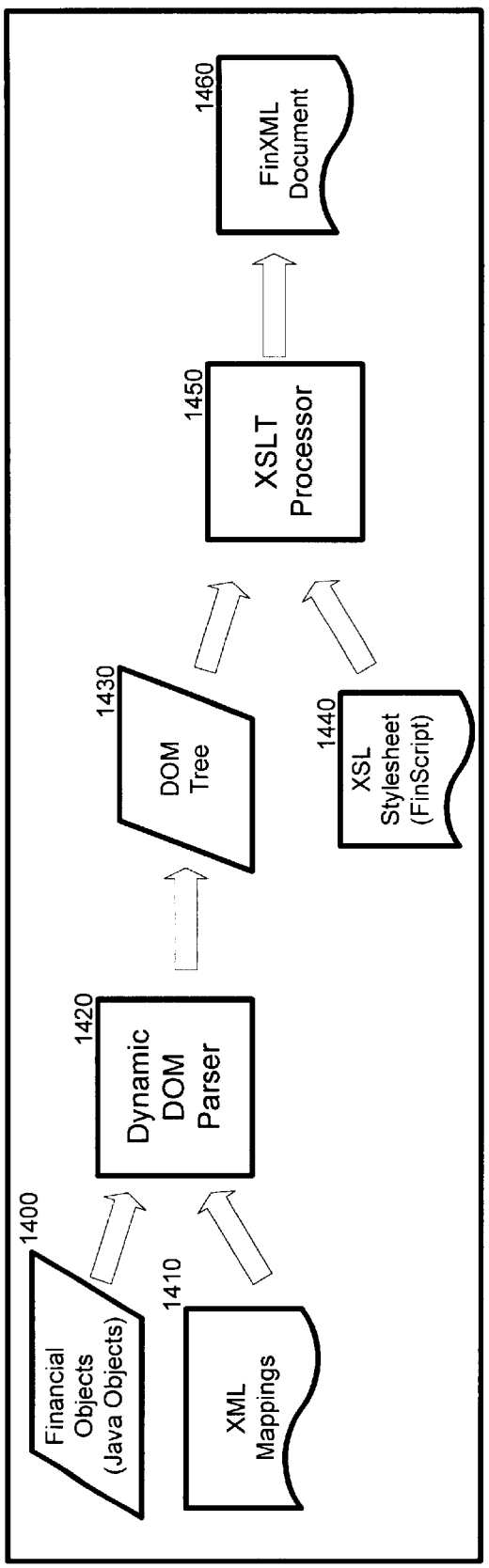
FIG. 15 shows the components utilized in converting financial objects into a FinXML document using FinScript in an embodiment of the present invention.
Figure 16:
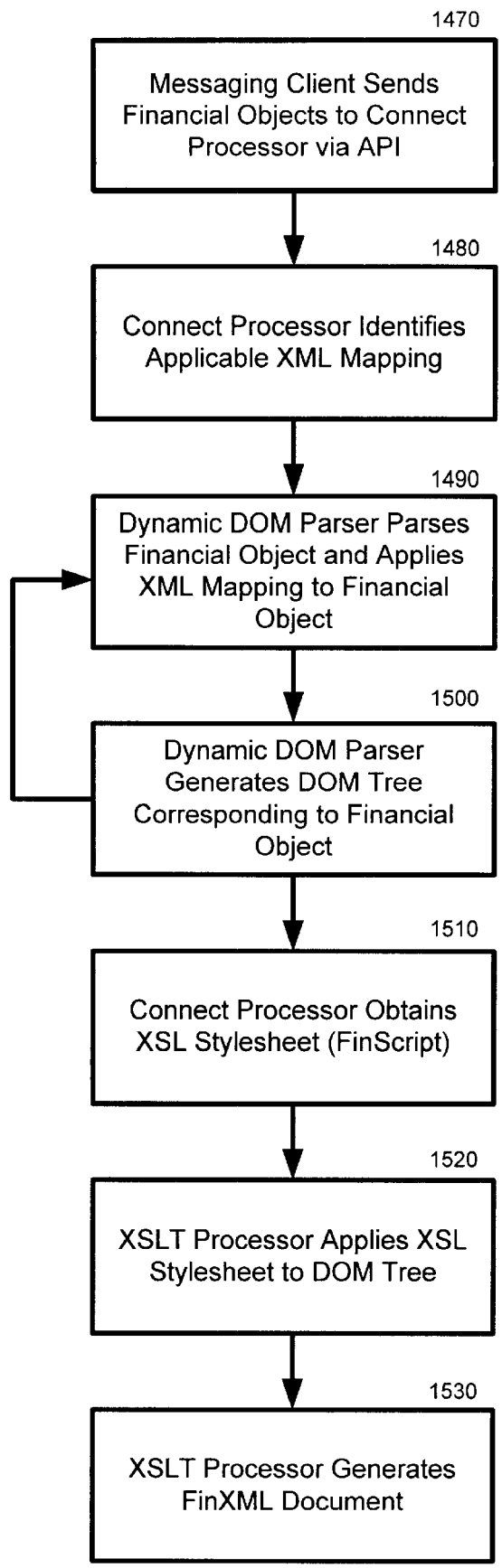
FIG. 16 shows a flowchart of the process of converting financial objects into a FinXML document using FinScript in an embodiment of the present invention.

When a user (Member or Provider) wishes to send information (e.g., a quote request or a price quote) to the CFOWeb System, the Connect Processor must convert the proprietary financial objects used by the user's internal system into FinXML (or other XML) documents that can be used by the CFOWeb System. FIG. 15 illustrates the components of the conversion (or encoding) process and FIG. 16 shows the steps to be executed by the system to perform such conversion, in an embodiment of the present invention. Note that these steps could be combined, certain steps could be removed and others deleted, and/or the order of the steps could be modified, in various other embodiments of this invention.

When the user wishes to submit information regarding a transaction (e.g., a quote request from a Member, a price quote from a Provider), the user's messaging client sends the financial objects 1400 (as shown in FIG. 15) as represented on the user's internal system to the Connect Processor via an application programming interface ("API") (step 1470 of FIG. 16). Typically, financial objects 1400 will be stored on the user's internal system as Java objects, which are in the form of "object graphs." Such object graphs consist of inter-linked nodes representing the elements and attributes of the financial object.

Upon receiving financial objects 1400, the Connect Processor will identify the applicable XML object mapping 1410 to apply to financial objects 1400 (step 1480). In some embodiments of this invention, XML object mappings 1410 may be customized by the user, in order to correspond to the form and structure of the user's proprietary financial objects.

The following is an example XML object mapping 1410 used in the present embodiment of this invention:

```
<object class='com.integral.finance.fx.FXRateC' tag='fxRate'>
    <objectproperty tag='baseQuoteCcy' accessor="getBaseQuoteCcy'/>
    <doubleProperty tag='rate' accessor='getRate'/>
    <objectProperty tag='variableQuoteCcy' accessor=
    'getVariableQuoteCcy'/>
</object>
<object class='com.integral.finance.currency.CurrencyC' tag='currency'>
    <stringProperty tag='isoCode' accessor='getISOName'/>
</object>
<object class='com.integral.finance.fx.FXTradeC' tag='fxTrade'>
    <objectProperty tag='dealtCcy' accessor='getDealtCcy'/>
    <doubleProperty tag='dealtPrincipal' accessor='getDealtPrincipal'/>
    <objectProperty tag='fxRate' accessor='getFXRate'/>
    <objectProperty tag='settledCcy' accessor='getSettledCcy'/>
    <doubleProperty tag='settledPrincipal' accessor=
    'getSettledPrincipal'/>
    <dateProperty tag='valueDate' accessor='getValueDate'/>
    <booleanProperty tag='isBuy' accessor='isBuy'/>
</object>
```

Next, the Connect Processor invokes a dynamic Document Object Model ("DOM") parser module 1420 to parse financial objects 1400 and apply XML object mapping 1410 to the elements and attributes of financial objects 1400 (step 1490). DOM is a platform- and language neutral interface that will allow programs and scripts to dynamically access and update the content, structure and style of documents. DOM provides a standard set of objects for representing HTML and XML documents, a standard for how these objects can be combined, and a standard interface for accessing and manipulating them. DOM is described in the Document Object Model (DOM) Level 1 Specification Version 1.0 (Oct. 1, 1998), World Wide Web Consortium (Massachusetts Institute of Technology, Institut National de Recherche en Informatique et en Automatique, Keio University) <http://www.w3.org/TR/REC-DOM-Level-1>.

The dynamic DOM parser generates a DOM "tree" (1430), which is a 1:1 mapping to the object graph of financial objects 1400 (step 1500). Generation of the DOM tree is dynamic and occurs on an as-needed basis as finite boundaries (transitive closure) of the object graph are determined. Thus, steps 1490 and 1500 may be repeated as necessary. Next, the Connect Processor obtains the XSL stylesheet 1440 to apply to DOM tree 1430 (step 1510), based on the object values contained in DOM tree 1430. The proprietary XSL stylesheet 1440—known as "FinScript"— contains rules for navigating (i.e., determining boundaries of) and converting DOM tree 1430 into a FinXML document. In the present embodiment of this invention, XSL stylesheets 1440 are linked to a single root. In some embodiments of this invention, XSL stylesheets 1440 may be customized by the user, in order to correspond to the form and structure of the user's proprietary financial objects.

The following is an example XSL stylesheet 1440 used in the present embodiment of this invention:

```
<xsl:stylesheet xmlns:xsl="http://www.w3.org/XSL/Transform/1.0">
    <xsl:import href="counterparties2XML.xsl" />
    <xsl:import href="fxUtil2XML.xsl" />
    <xsl:import href="events2xml.xsl" />
    <xsl:output method="xml" indent="yes" />
    <!-- replace the built-in rules for text and attributes -->
    <xsl:template match="text()|@*" />
```

-continued

```
<xsl:template name="fxSpot2XML">
    <fxSpot>
        <entryDate>
            <xsl:value-of select="getTradeDate" />
        </entryDate>
        <xsl:apply-templates select="getTradeDate" mode=
        "fxSpot2XML" />
        <xsl:apply-templates select="getSettlementDate" mode=
        "fxSpot2XML" />
        <xsl:apply-templates select="getValueDate" mode=
        "fxSpot2XML" />
        <xsl:apply-templates select="getDealtCurrency" mode=
        "fxSpot2XML" />
        <xsl:apply-templates select="getSettledCurrency" mode=
        "fxSpot2XML" />
        <events>
            <xsl:apply-templates select=
            "getFinancialEvents" mode=
            "events2xml" />
        </events>
    </fxSpot>
</xsl:template>
<!-- fxSpot2XML -->
</xsl:stylesheet>
```

Next, the Connect Processor invokes a XSLT processor 1450—an off-the-shelf component (e.g., International Business Machines Corp.'s "Alphaworks")—to apply the rules of the XSL stylesheet 1440 to DOM tree 1430 (step 1520). This process results in the generation of a FinXML document 1460 (step 1530) that can be used by the CFOWeb System. The following is an example FinXML document 1460 generated by the XSLT processor 1450 in the present embodiment of this invention:

```
<fxSpot>
    <tradeDate>1999-12-24</tradeDate>
    <valueDate>1999-11-04</valueDate>
    <dealtAmount payer="ABC" receiver="XYZ">
        <currency>JPY</currency>
        <amount>100000000</amount>
    </dealtAmount>
    <settledAmount payer="XYZ" receiver="ABC">
        <currency>USD</currency>
        <fxRate>
            <baseCurrency> USD </baseCurrency>
            <baseUnits> 1 </baseUnits>
            <quoteCurrency> JPY </quoteCurrency>
            <quoteUnits> 1 </quoteUnits>
            <rate> 102.5 </rate>
        </fxRate>
    </settledAmount>
</fxSpot>
```

Note that the same process described above will be used by the Connect Messaging Server to convert the proprietary financial objects used by the various servers of the CFOWeb System into FinXML (or other XML) documents that can be sent to the Connect Processor.

b. Conversion (Decoding) of FinXML Documents to Financial Objects

Figure 17:
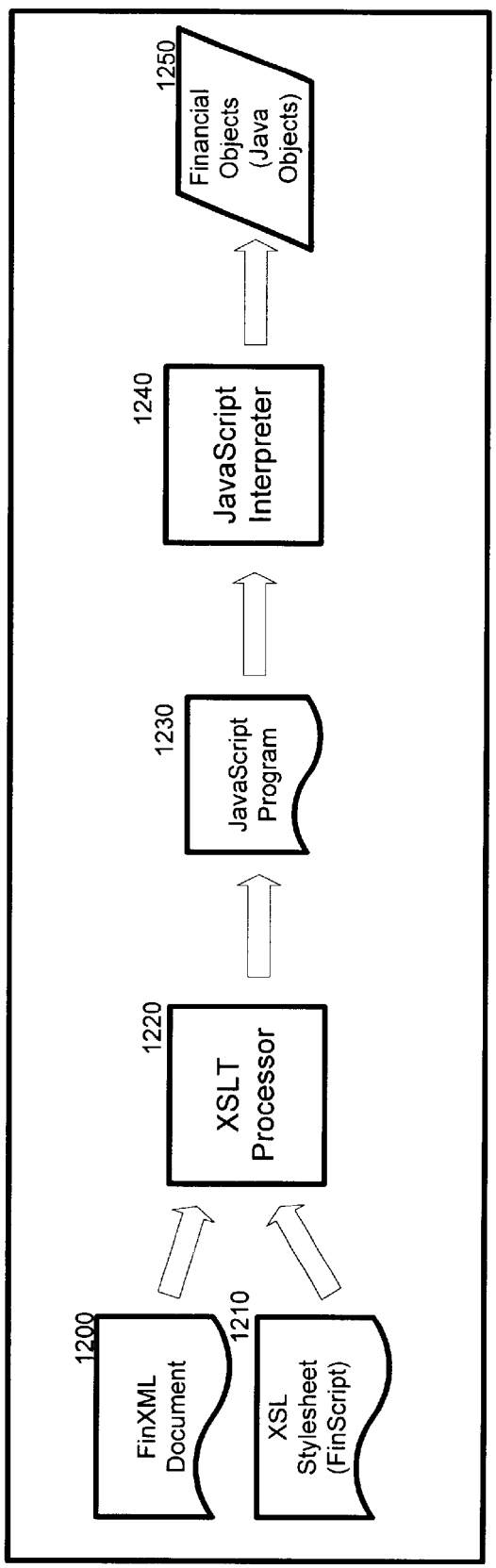
FIG. 17 shows the components utilized in converting a FinXML document into financial objects using FinScript in an embodiment of the present invention.
Figure 18:
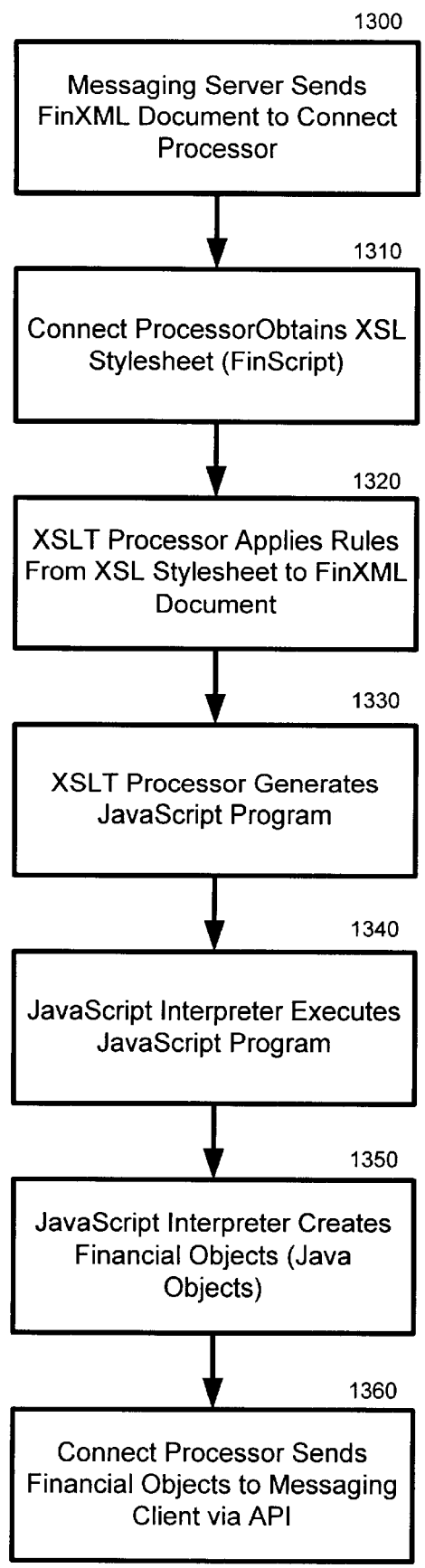
FIG. 18 shows a flowchart of the process of converting a FinXML document into financial objects using FinScript in an embodiment of the present invention.

When the CFOWeb System is ready to send information regarding a transaction to a user (Member or Provider) Connect Processor must convert the FinXML (or other XML) documents into proprietary financial objects that can be used by the user's internal system. FIG. 17 illustrates the components of the conversion (or decoding) process and FIG. 18 shows the steps to be executed by the system to perform such conversion, in an embodiment of the present invention. Note that these steps could be combined, certain steps could be removed and others deleted, and/or the order of the steps could be modified, in various other embodiments of this invention.

When the CFOWeb System wishes to send information regarding a transaction (e.g., a quote request from a Member, a price quote from a Provider), the Connect Messaging Server sends the previously-created FinXML (or other XML) document 1200 (as shown in FIG. 17) to the Connect Processor (step 1300 of FIG. 18). The following is an example FinXML document 1200 created in the present embodiment of this invention:

```
<fxSpot>
    <tradeDate>1999-12-24</tradeDate>
    <valueDate>1999-11-04</valueDate>
    <dealtAmount payer="ABC" receiver="XYZ">
        <currency>JPY</currency>
        <amount>100000000</amount>
    </dealtAmount>
    <settledAmount payer="XYZ" receiver="ABC">
        <currency>USD</currency>
        <fxRate>
            <baseCurrency> USD </baseCurrency>
            <baseUnits> 1 </baseUnits>
            <quoteCurrency> JPY </quoteCurrency>
            <quoteUnits> 1 </quoteUnits>
            <rate> 102.5 </rate>
        </fxRate>
    </settledAmount>
</fxSpot>
```

Upon receiving FinXML (or other XML) document 1200, the Connect Processor will obtain the XSL stylesheet 1440 to apply to FinXML document 1200 (step 1310), based on the transaction type identified in FinXML document 1200. There is a different XSL stylesheet for each type of transaction and all options supported by the CFOWeb System. The proprietary XSL stylesheet 1210—known as "FinScript"—contains rules for converting FinXML document 1200 into a JavaScript program, including reusable fragments of JavaScript programming code. In the present embodiment of this invention, XSL stylesheets 1210 are linked to a single root. In some embodiments of this invention, XSL stylesheets 1210 may be customized by the user, in order to correspond to the form and structure of the user's proprietary financial objects.

The following is an example XSL stylesheet 1210 used in the present embodiment of this invention:

```
<xsl:stylesheet xmlns:xsl="http://www.w3.org/XSL/Transform/1.0">
    xmlns="http://www.finxml.org/finxml/1.0">
    <xsl:output method="text" />
    <xsl:output indent="yes" />
    <xsl:template match="text()|@*" mode="fxSpot" />
    <xsl:template match="fxSpot">
        <xsl:text>someProperties=newPackages.java.util.HashMap();
            someProperties.put
            (Packages.com.integral.finance.trade.TradeCreationKeys.-
            TRADE_DATE, "</xsl:text>
        <xsl:value-of select="tradeDate" />
        <xsl:text>")trade =
            Packages.com.integral.apps.ui.fxtrade.FXTradeFactory.-
            newFXSpotTrade
            (applicationEnvironment, uow, null, null, someProperties);
            trade.setFrontOfficeID(tradeID);
        </xsl:text>
        <xsl:apply-templates select="externalId" mode="fxSpot" />
        <xsl:apply-templates select="valueDate" mode="fxSpot" />
        <xsl:apply-templates select="settlementDate" mode="fxSpot" />
```

-continued

```
        <xsl:apply-templates select="dealtAmount" mode="fxSpot" />
        <xsl:apply-templates select="settledAmount" mode="fxSpot" />
        events = trade.getFinancialEvents();
        <xsl:apply-templates select="events" mode="events">
            <xsl:with-param name="object" select=""events"" />
        </xsl:apply-templates>
    </xsl:template>
    <!-- fxSpot -->
    ...
</xsl:stylesheet>
```

Next, the Connect Processor invokes a XSLT processor 1220—an off-the-shelf component (e.g., International Business Machines Corp.'s "Alphaworks")—to apply the rules of the XSL stylesheet 1210 to FinXML (or other XML) document 1200 (step 1320). This process results in the generation of a JavaScript program 1230 (step 1330) that can be executed to generate Java objects. The following is an example JavaScript program 1230 generated by the XSLT processor 1220 in the present embodiment of this invention:

```
counterpartyA = Packages.com.integral.finance.counterparty.-
CounterpartyFactory.newLegalEntity ();
...
someProperties = newPackages.java.util.HashMap ();
someProperties.put (Packages.com.integral.finance.trade.-
TradeCreationKeys.TRADE_DATE, "2000-06-12")
trade = packages.com.integral.apps.ui.fxtrade.FXTradeFactory.-
newFXSpotTrade (applicationEnvironment,
uow, null, null, someProperties);
valueDate = Packages.com.integral.finance.dateTime.DateTimeFactory.-
newDate ("2000-06-14");
trade.setValueDate (valueDate);
...
trade.setCounterpartyA (counterpartyA);
trade.setCounterpartyB (counterpartyB);
```

Next, the Connect Processor invokes a JavaScript interpreter 1240—an off-the-shelf component (e.g., Mozilla.org's "Rhino" JavaScript interpreter)—to execute the JavaScript program 1230 (step 1340). This process results in the generation of financial objects 1250 Java objects—(step 1350) that can be used by the user's internal systems. The Connect Processor sends the financial objects 1250 to the messaging client application of the user's system via an API (step 1360).

Note that the same process described above will be used by the Connect Messaging Server to convert the FinXML (or other XML) documents created and sent by the Connect Processor into proprietary financial objects to be used by the various servers of the CFOWeb System.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. One skilled in the art will readily appreciate that other applications may be substituted for those set forth herein without departing from the spirit and scope of the present invention. Accordingly, the invention should only be limited by the claims included below.

What is claimed is:

1. A system for facilitating transactions involving the exchange of financial instruments, the system comprising:

(a) a transaction data parser that can extract transaction data describing a transaction conducted using the system, wherein the transaction data can include:

53

(i) a type of the transaction;
(ii) a plurality of parties to the transaction, including a member user and a provider user selected by the member user from a plurality of provider users;
(iii) a payment schedule pursuant to which a first party to the transaction will make one or more payments to a second party to the transaction; and
(iv) rate information which can include information relating to an interest rate or an exchange rate that can affect the calculation of the amount of one or more of the payments made pursuant to the payment schedule;

(b) a reference data parser that can extract profile information about the parties to the transaction; and (c) a market data parser that can extract market data provided to the system, the market data including market interest rates or currency exchange rate.

2. The system of claim 1 wherein the type of the transaction is a foreign exchange spot.

3. The system of claim 1 wherein the type of the transaction is a foreign exchange forward.

4. The system of claim 1 wherein the type of the transaction is an interest rate fixed-float swap.

5. The system of claim 1 wherein the type of the transaction is an interest rate float-float swap.

6. The system of claim 1 wherein the type of the transaction is an interest rate cap.

7. The system of claim 1 in which the type of the transaction is an interest rate floor.

8. The system of claim 1 wherein the type of the transaction is a fixed deposit.

9. The system of claim 1 wherein the type of the transaction is a fixed loan.

10. The system of claim 1 wherein the type of the transaction is a float deposit.

11. The system of claim 1 wherein the type of the transaction is a float loan.

12. The system of claim 1 wherein the type of the transaction is a foreign exchange option.

13. The system of claim 1 wherein the type of the transaction is a foreign exchange swap.

14. The system of claim 1 wherein the type of the transaction is a cross currency fixed-fixed swap.

15. The system of claim 1 wherein the type of the transaction is a cross currency fixed-float swap.

16. The system of claim 1 wherein the type of the transaction is a cross currency float-float swap.

17. The system of claim 1 wherein the type of the transaction is a forward rate agreement.

18. The system of claim 1 wherein the type of the transaction is a customized trade.

19. A system for facilitating transactions involving the exchange of financial instruments, the system comprising:

(a) a member client node that can be used by a member user of the system to conduct a transaction;

(b) a provider client node that can be used by a provider user of the system to conduct the transaction with the member user; and (c) a server node that facilitates the exchange of messages among the member client and provider client nodes, including a transaction message that includes information describing the transactions between the member user and the provider user, the server node including:

(i) an interactive trading mechanism that enables the member user to select the provider user from a plurality of provider users and to interactively negotiate the terms of the transaction with the selected provider user; and (ii) an automated messaging system that facilitates the automated exchange of the transaction message between the server node and the provider client node.

20. The system of claim 19 wherein the messages whose exchange is facilitated by the server node can include:

(a) transaction data describing the transaction, including:
(i) a type of the transaction;
(ii) a plurality of parties to the transaction, including the member user and the provider user;
(iii) a payment schedule pursuant to which the member user will make one or more payments to the provider user; and
(iv) rate information which can include information relating to an interest rate or an exchange rate that can affect the calculation of the amount of one or more of the payments made pursuant to the payment schedule;

(b) reference data, including profile information about the parties to the transaction; and (c) market data, including market interest rate or currency exchange rates.

21. The system of claim 19 wherein the negotiated terms include pricing of the transaction.

22. The system of claim 19 wherein the negotiated terms include acceptance of the pricing of the transaction.

23. The system of claim 19 wherein the negotiated terms include settlement of the transaction.

24. The system of claim 19 wherein both the member client node and the provider client node are physically remote from the server node.

25. An automated financial object conversion and messaging system for exchanging messages describing transactions involving the exchange of financial instruments between a provider user of the system and one or more other member users of the system, the system comprising:

(a) a server node that can convert a first set of internal objects, representing the terms of a transaction between the provider user and a member user of the system, into a transaction message employing a standard format for representing the transaction, wherein the first set of internal objects employs any format that can be utilized by a back-end system of the member user;

(b) a provider node that can convert the transaction message into a second set of internal objects, wherein the second set of internal objects employs any format that can be utilized by a back-end system of the provider user; and (c) an automated message exchange mechanism that automatically can exchange messages employing the standard format, including the transaction message, between the server node and the provider node.

26. The system of claim 25 wherein the standard format is an XML format.

27. The system of claim 26 wherein the XML format can represent:

(a) transaction data describing the transaction, including:
(i) a type of the transaction;
(ii) a plurality of parties to the transaction, including the provider user and the member user of the system;
(iii) a payment schedule pursuant to which the member user will make one or more payments to the provider user; and
(iv) rate information which can include information relating to an interest rate or an exchange rate that can affect the calculation of the amount of one or more of the payments made pursuant to the payment schedule;

(b) reference data, including profile information about the parties to the transaction; and (c) market data, including market interest rate or currency exchange rates.

28. A method for converting a first set of internal objects, representing the terms of a transaction involving the exchange of financial instruments between a provider user and a member user of a system for facilitating transactions involving the exchange of financial instruments, into a transaction message employing a standard format for representing the transaction, the method comprising the following steps:

(a) applying an XML mapping to the first set of internal objects in order to dynamically generate a Document Object Model tree; and (b) applying an XSL stylesheet to convert the Document Object Model tree into the transaction message, wherein the transaction message includes transaction data describing the transaction, including:

(i) a type of the transaction;

(ii) a plurality of parties to the transaction, including the member user and a provider user selected by the member user from a plurality of provider users;

(iii) a payment schedule pursuant to which the member user will make one or more payments to the provider user; and (iv) rate information which can include information relating to an interest rate or an exchange rate that can affect the calculation of the amount of one or more of the payments made pursuant to the payment schedule.

29. The method of claim 28 wherein the standard format is an XML format.

30. The method of claim 28 wherein the first set of internal objects includes Java objects.

31. A method for converting a transaction message employing a standard format for representing the terms of a transaction involving the exchange of financial instruments between a provider user and a member user of a system for facilitating transactions involving the exchange of financial instruments, and a first set of internal objects representing the transaction, the method comprising the following steps:

(a) applying an XSL stylesheet to the transaction message in order to dynamically generate a JavaScript program; and (b) executing the JavaScript program to produce the first set of internal object, wherein the transaction message includes transaction data describing the transaction, including:

(i) a type of the transaction;

(ii) a plurality of parties to the transaction, including the member user and a provider user selected by the member user from a plurality of provider users;

(iii) a payment schedule pursuant to which the member user will make one or more payments to the provider user; and (iv) rate information which can include information relating to an interest rare or an exchange rate that can affect the calculation of the amount of one or more of the payments made pursuant to the payment schedule.

32. The method of claim 31 wherein the standard format is an XML format.

33. The method of claim 31 wherein the first set of internal objects includes Java objects.

* * * * *